United States Patent [19]

Scher et al.

[11] Patent Number: 5,062,066
[45] Date of Patent: Oct. 29, 1991

[54] MODEL REFERENCED CONTROL OF A FOOD TREATMENT DEVICE

[75] Inventors: Larry I. Scher, Bronx, N.Y.; Laura Scharr, Montclair, N.J.; Jeffrey Jenniges, Westminster, Calif.

[73] Assignee: Nabisco Brands, Inc., Parsippany, N.J.

[21] Appl. No.: 395,436

[22] Filed: Aug. 17, 1989

[51] Int. Cl.[5] .................. G05B 13/04; G06F 15/18
[52] U.S. Cl. .................... 364/578; 364/552; 364/149; 99/325
[58] Field of Search .............. 364/578, 138, 146, 149, 364/150, 468, 552, 550, 551.01, 148, 164, 165, 556, 526; 99/325, 326; 356/72, 402

[56] References Cited

U.S. PATENT DOCUMENTS

| | | | |
|---|---|---|---|
| 4,195,337 | 3/1980 | Bertrand et al. | 364/151 |
| 4,257,105 | 3/1981 | Stewart et al. | 364/149 |
| 4,433,232 | 2/1984 | Tachikawa et al. | 356/43 |
| 4,512,747 | 4/1985 | Hitchens et al. | 364/151 |
| 4,555,756 | 11/1985 | Yamanaka | 364/578 |
| 4,613,952 | 9/1986 | McClanahan | 364/578 |
| 4,663,703 | 5/1987 | Axelby et al. | 364/149 |
| 4,721,448 | 1/1988 | Irish et al. | 364/164 |
| 4,849,625 | 7/1989 | Camerini Porzi | 356/425 |
| 4,904,912 | 2/1990 | Yamamoto | 364/149 |

FOREIGN PATENT DOCUMENTS 2179425  8/1987  Japan .................... 356/402

OTHER PUBLICATIONS

Food Technology. Dec. 1974, pp. 50, 52-53; V. A. Kaiser, "Modeling and Simulation of a Multi-Zone Band Oven".

Primary Examiner—Parshotam S. Lall
Assistant Examiner—Michael Zanelli

[57] ABSTRACT

An automatic control of an apparatus that processes food products uses a model that provides a predicted value for product attributes, such as color. The predicted values are dynamically compensated, so that the predictions track the real response by an amount that can be estimated. The use of the model provides infrared sensors for use in either feedforward or feedback control, to control the food processing apparatus.

13 Claims, 10 Drawing Sheets

MODEL REFERENCED CONTROL OF A FOOD TREATMENT DEVICE

FIELD OF THE INVENTION

The present invention relates to the control of a process using model referenced control, and more particularly, to processes relating to preparation of food products.

BACKGROUND OF THE INVENTION

Current methods for baking, toasting and roasting in industrial processes for food preparation are manually controlled. To adjust for product outlet errors, such as color and moisture, a human operator must make adjustments to the process controls. A typical parameter that is controlled is the gas flow to burners in individual oven zones, for example. If an operator sees that the product is coming out too dark, he may adjust the temperature downwardly.

Errors in the output product are measured either by periodic off-line testing or continuous on-line sensors. From these measurements, adjustments are made by a human operator, and are based on operator knowledge and line performance history. These adjustments are often made long after the error has been detected so that a large amount of waste material has been generated.

In some applications, such as roasting nuts, a high-temperature, short-time process (HTST) is desirable. The roasting process with HTST has increased temperatures, with a shorter roasting time for the nuts. Nuts roasted by the HTST process tend to be preferred by tasters. Other advantages of the HTST process are increased roaster capacity, decreased operating cost per pound, and increased product uniformity.

The problem with the HTST process is that it is difficult to achieve without a more advanced control than human operator adjustment like that described above. In other words, the HTST process must be more precisely and continuously controlled than that achievable by a human operator to realize the advantages of the process. Other processes similarly need automatic control to achieve the advantages of uniformity of product, a better product, and reduction of production waste.

There is thus a need to provide an automatic control of a process for preparation of food products.

SUMMARY OF THE INVENTION

The need for an automatic control of a process for preparation of food products is met by the present invention which uses a model that describes the effect of operating variables and infeed material qualities on the product attributes. The model is used as part of a supervisory control of the apparatus which processes the food product.

A model used in the present invention provides a predicted value for product attributes. These predicted values are dynamically compensated, so that the predictions track the real response by an amount that can be estimated. The use of the model provides infrared sensors for use in either feedforward or feedback control. Feedforward control is the adjusting of subsequent zones based on the predictions, while feedback control adjusts the previous zone of a multizone system.

The described embodiment of the invention predicts the color of a food product, and uses this predicted color to control the processing of the food product. The predicted color allows for feed forward controlling, while sensing of the color of the discharged product, and comparison with the predicted color, allows for feedback control.

The model describes behavior of the real system in terms of classes of variables. Operating condition variables are those which may be manipulated during operation of the process. System variables are those that may be manipulated to some extent by reorganizing the equipment, but are not variable during operation. Product state attributes are those features of a product that are to be controlled to match a standard or specification. The attributes are variables of processing history.

In the industrial processing of food products, there is often a transport delay. The present invention uses a model of the process dynamics without delay to predict the effects of present process variables on future process output. These predicted values are used to generate an error signal. The error signal can be used to provide a feedforward control of the process. Eventual feedback error, from a comparison of predicted versus observed output attributes, is used to compensate for systematic modeling errors and process changes.

DETAILED DESCRIPTION

Figure 1:
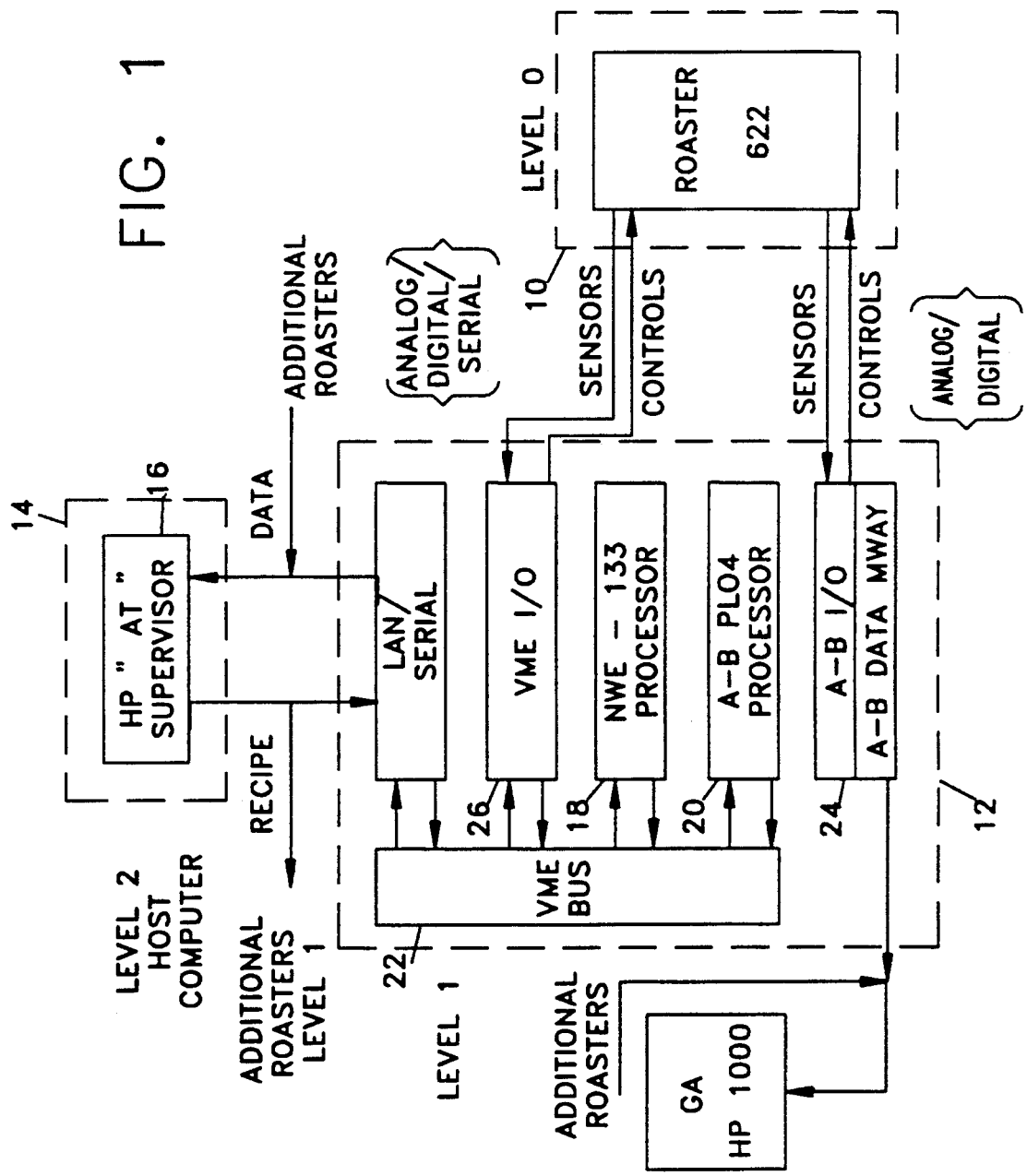
FIG. 1 is a simplified block diagram of a system for providing a model referenced controlled process in accordance with an embodiment of the present invention.

FIG. 1 shows a simplified block diagram of a system for providing a model referenced controlled process. In the embodiment illustrated in FIG. 1, a roaster used for roasting nuts is controlled, although other types of ovens and processes (such as baking, drying) can likewise be controlled, as described in more detail later.

A roaster 10 is coupled to a first level supervisor 12. The roaster 10 sends sensor information to the first level supervisor 12 and from it, receives control signals that control the variables in the roaster 10. The first level supervisor 12 is coupled to a second level supervisor 14 that provides the interface to a human user.

The second level supervisor 14 can be a computer 16 such as a Hewlett-Packard AT computer, for example. This second level supervisor 14 performs a supervisory and data monitoring function. The computer 16 communicates with the first level supervisor 12 for information transfer to and from a roast simulation and control model resident in the first level supervisor 12. The computer 16 provides a setpoint recipe table, which in the roaster embodiment described includes roast color setpoints, standard nominal zone temperature setpoints per nut type, number of zones employed for control, and feedback gain calculation method choice. To the user, the computer 16 provides process and product reports, tabular data reports, and CRT and laser jet printer graphic display.

In the first level supervisor 12 resides the predictive roaster simulation and control model, specifically in a microprocessor computer 18. This microprocessor 18 can be a Motorola MVME-133 real time microprocessor computer, for example. Another processor 20 is coupled to the microprocessor 18 via a VME bus 22. This other processor 20 can be an Allen-Bradley PLC-5 processor, for example.

The first level supervisor 12 has two input/output sections 24, 26, with the first I/O section 24 being coupled between the roaster 10 and the processor 20, and the second I/O section 26 coupled between the roaster 10 and the VME bus 22.

The second I/O section 26 allows for direct sensor communication to the VME bus 22 and for system expansion (i.e. additional roasters 10).

The first level supervisor 12 provides updated zone temperature set points to gas flow controllers in the roaster 10 for the maintenance of a uniform roast level. The simulation model resident in the microprocessor 18 provides predicted roast color values to the control model, also resident in the microprocessor 18. The required input information for the simulation model is provided by on-line measured process and material attribute sensor information continuously transferred from the roaster 10 to the first supervisor level 12.

The control model in the microprocessor 18 provides feedback and feedforward transfer functions to the processor 20. There are two methods of calculating feedback transfer functions—simulation step change response or control model theory computation. The choice of calculation method is provided by the recipe table from the computer 16.

The feedback and feedforward transfer functions are used by the processor 20 to convert roast color errors (i.e., predicted roast color in comparison to setpoint and on-line measured colors) to zone temperature adjustments. These zone temperature adjustments are subsequently converted to the updated zone temperature setpoints by which the gas flow controllers in the roaster 10 are set. This manipulates the zone gas flows in order to attain the required zone temperatures.

The processor 20 therefore receives continuous sensor information from the roaster 10, and provides and calculates predicted roast colors and controller gain constants to output the updated zone temperature setpoints. Further, the processor 20 serves as an input/output analog to digital interface.

The roaster 10 includes the material attribute sensors, the process sensors, and the final control elements, i.e., the zone gas flow control valves in this embodiment. These sensors and control elements communicate directly with the processor 20, using analog signals. The sensors and roaster 10 are described in more detail below, with reference to FIG. 2.

Figure 2:
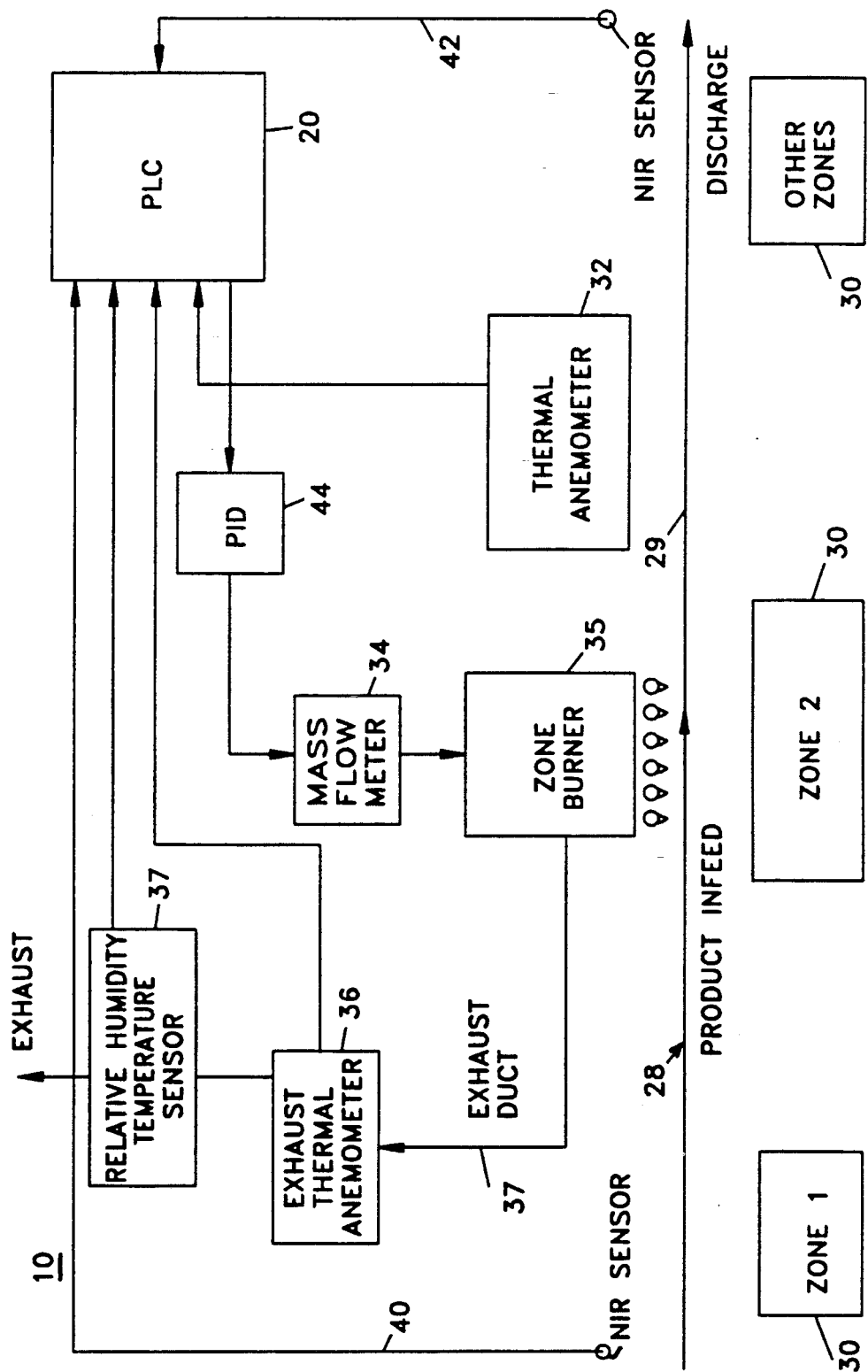
FIG. 2 illustrates the control of one zone of a multiple zone roaster constructed in accordance with an embodiment of the present invention.

The schematic diagram of FIG. 2 illustrates the control of the second zone 30 of a multiple zone roaster 10. The control of the remaining zones in the roaster 10 are identical to the control of the illustrated second zone 30. The product is conveyed through the multiple zones on a conveyor 28.

For automatic roasting control, the first level supervisor 12 requires sensed process variables to serve as inputs to the roast model. The sensed process variables allow the predictive roast model to provide updated predicted roast attributes (roast color, for example) for the automatic roast control. In embodiments of the present invention which have different predictive models for controlling different processes (e.g. biscuit baking), different process variables can be sensed and used as inputs to the predictive model.

In roasting nuts, the roaster nut bed air velocity is a process variable that should be sensed and provided as an input to the predictive model. The maintenance of a uniform and sufficient bed air velocity is critical for attaining roast color control. The air velocity is sensed for a nut bed 29 of the zone 30 by thermal anemometer arrays 32 positioned at the discharge side of the nut bed 29. An example of a suitable array 32 is an EVA-4000 Electronic Velocity Array made by Kurz Instruments, Inc.

If there are five roaster zones in the roaster 10, the arrays 32 are positioned at two different positions for each of the five roaster zones, completely traversing the entire width of the nut bed 29. Four velocity sensors are used per probe array, each sensor providing an independent air velocity signal. Electronic averaging of the four sensor signals per array is also provided. The probe arrays therefore provide local bed air velocities at different positions across the bed width and averaged bed air velocities per array and zone.

The thermal anemometer arrays 32 provide two process measurements, the standard linear air velocity and air temperature measured for each sensor element. The measured air temperature represents roaster bed outlet air temperature. The measured linear air velocity is used for determining the circulating volumetric air flow per zone.

The output from the anemometer arrays 32, like the output from the other sensors described below, are analog signals that are converted to digital signals and fed to the processor 20.

Another measurement used as an input for the predictive roast model is fuel flow measurement. From this measurement, the model can provide the system mass and energy balance. Also, fuel flow profiling can provide roaster energy consumption information for purposes of plant monitoring and energy optimization tracking. Mass flow meters 34 are situated in the fuel lines upstream of the zone burner 35. These can be mass flow meters using thermal anemometry that are manufactured by Kurz Instrument, Inc., for example. Burner controls 44 control the amount of fuel fed to the zone burner 35, and are adjusted according to burner control signals from the processor 20.

Exhaust flow and temperature measurement are further process variables supplied as inputs to the predictive roast model for purposes of roast system mass and energy balance, and also provide information for energy maintenance. The percentage air flow recirculation per roaster zone can be determined from these variables and displayed. These process variables are provided by thermal anemometer probes 36, such as those manufactured by Kurz Instruments, Inc., and are arranged in the exhaust duct 37 of each of the zones. The probes 36 provide the processor 20 with standard duct linear air velocity and volumetric exhaust flow, and exhaust temperature.

Another variable that is sensed is the exhaust absolute humidity, which is needed by the roast model for the roast system mass and energy balance. The percentage of air recirculation in the roaster zone is manipulated based on this variable. The exhaust absolute humidity is measured in each zone exhaust duct 37 by a relative humidity temperature sensor, such as that available from Cosa Instrument Corp. Again, the relative humidity and the temperature are provided as analog signals to the processor 20. The predictive roast model calculates and reports absolute humidity content based on relative humidity, dry bulb temperature, and system total pressure.

The above described variables represent the process variables that are used in the roasting process of the described embodiment according to the present invention. The attributes of the materials (the product) that are being processed, in this case roasted, also need to be sensed. For nuts, the attribute that is sensed in the illustrated embodiment is the color of the nut. Other attributes of the nut that could be measured are the nut moisture, the protein control, the oil content and the coating thickness.

In the illustrated embodiment, material attributes are sensed by near infrared reflectance (NIR) spectroscopy. The material attributes, in this embodiment nut color and moisture content, are sensed at the infeed of the roaster 10 (before zone 1) and at the discharge end (after the last zone) by NIR sensors 40, 42. The infeed NIR sensor 40 is mounted at the center of the conveyor 28, while the discharge NIR sensor 42 continuously traverses across the conveyor width. The discharge color and moisture content are averaged for each sweep across the conveyor 28. The infeed and discharge color and nut moisture can be sensed at periodic time intervals. Analog signals are sent from the sensors 40, 42 to the processor 20.

An example of an NIR sensor suitable for use in the present invention is the Quantum 1200 NIR analyzer manufactured by L.T. Industries.

Based on the information obtained by the material attribute sensors and the process sensors, feedforward and feedback control gains can be calculated by the control model that will control the roasting process. In the embodiment described above, it is the temperature in the ovens that is controlled to obtain the desired color of the nut.

Rather than rely on operator knowledge and manipulations of the oven setpoints, the present invention continuously updates the oven setpoints based upon model predictions. In the described roaster embodiment, the NIR sensors 40, 42 are arrayed at the infeed and discharge ends of the roaster 10. The color is not sensed within the ovens themselves or between zones. Rather, the color of the nut in these areas is provided by the model for purposes of manipulating the oven setpoints. This avoids the need for providing sensors in the hostile environment of an oven.

Figure 3:
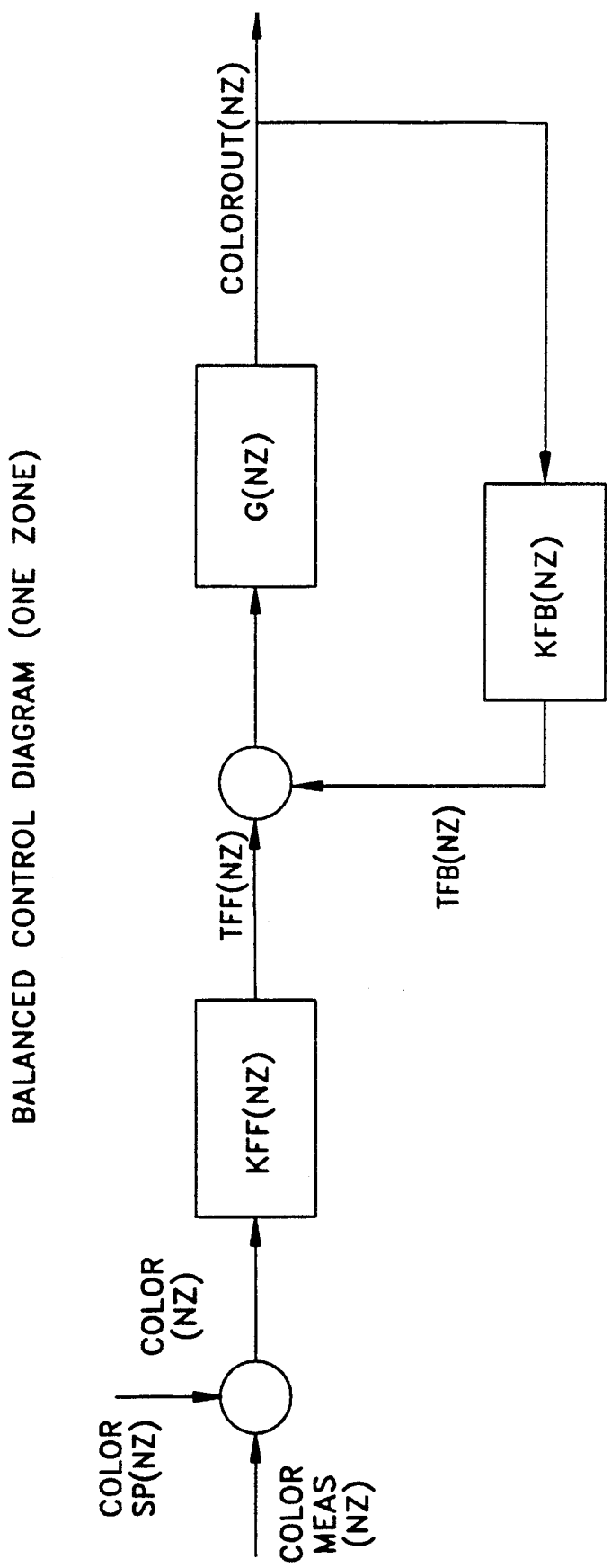
FIG. 3 illustrates a simplified balance control diagram for one zone of the roaster according to the present invention.

FIG. 3 illustrates a simplified balanced control diagram for one zone of the roaster. The measured inlet color (color means (NZ)) and the specified output color (color sp(NZ)) are inputs to the control. The desired output color for the zone (color (NZ)) is produced from the measured inlet color and the specified output color. This desired output color is then multiplied by the feedforward gain KFF (NZ) calculated by the control model from data from the product model.

The multiplication of the desired output color with the feedforward gain produces a feedforward desired temperature change TFF (NZ). This is supplied to produce a process gain G(NZ) for that particular zone, which controls the setting of the zone's oven temperature. The actual output color of the nut leaving the last zone in the roaster 10, colorout (NZ), is measured by the NIR sensors described earlier. This actual output color is multiplied by the feedback gain KFB(NZ) to produce a feedback desired temperature change TFB(NZ), which is added to the feedforward desired temperature change. The sum of the feedforward and feedback desired temperature changes is sent to calculate the process gain for the zone, so that the zone oven temperature is properly set or adjusted.

The feedforward gain is the change in the manipulated variable, in this case temperature, divided by the error in the upset variable, in this case color error within a zone. Mathematically, the resulting temperature change sent to the gas flow controllers is represented by the equation:

$$TFF(NZ) = KFF(NZ)^* color(NZ).$$

The calculation of the feedback gain is similar, and is defined as the multiplication factor relating zone temperature changes to the outlet color error. Again, the mathematical representation of this relationship is: $TFB(NZ) = COLOROUT^* KFB(NZ)$. The feedback color error (measured outlet color—set point color) is divided by the number of zones used for control.

An overview of the method of control is as follows. A product model (developed from the integral heat treatment theory of color development) calculates the color profile of the product with the roaster 10. Data from the product model is sent to the control model which then differentiates the color development equation to calculate the corresponding feedforward and feedback gains. The color errors are calculated based on deviations from the set point curve, which is the curve that during normal steady state conditions gives the desired outlet peanut color. These color errors are multiplied by the feedback and feedforward gains to result in the changes in temperature needed for the color profile to return to its set point state. The changes in temperatures are made by appropriate adjustments of the gas burners in the individual zones.

As mentioned earlier, although the invention has been described in detail above in the embodiment of a roaster, the invention is applicable to other types of processes. For example, automatic, in-line model referenced control can be used to control a baking oven. In such an application, variables other than color can also be utilized as inputs to the model. These can include moisture, texture, density etc. Further, the invention allows decoupling of the input variables such that the desired moisture setpoint can be changed independently of the desired color setpoint. This allows for a more precise control of a product.

The mathematical model used in the present invention depicts numerically the simultaneous heat and mass transport and physical/chemical phenomena occurring in the food during the pertinent unit operation and provides product attribute profiles as a function of infeed raw material attributes, equipment design parameters, and operating conditions. Major product attributes such as moisture content, temperature, texture, and color are determined at internal and surface food positions.

The example physical system described below is the high temperature forced convection dehydration of a packed bed of hygroscopic food granules, such as nuts. The formulation and solution of the governing mass and enthalpy balance conservation equations are described for the physical system at both microscopic product and macroscopic system levels. Particular emphasis will be addressed at the prediction of governing reaction kinetics, transport phenomena, thermo dynamics, and physical/transport properties for the physical system.

A mathematical model is a mathematical quantitative description of a real, physical system. Thus, the physical system must be defined in terms of the pertinent physical and chemical mechanisms and phenomena that are occurring within the physical system.

The example physical system described earlier is the high temperature forced convection dehydration of a packed bed of hygroscopic food granules (e.g. nut roasting). The food granules are situated in a deep-bed (e.g. 0.07 to 0.10 meters bed depth) subjected to high temperature (e.g. 400 to 525 deg K.) normal direction/through circulation air contacting. The food granules are typically protein/carbohydrate/fat/inert/water complex mixtures that are porous and roughly spherical in shape, with diameter range of 6 to 12 mm. This system is cross-flow in design, pertaining to the airflow in a normal direction and the bed flow in a longitudinal direction.

The food granules exhibit both physical and chemical dynamic changes during the high temperature convection operation. High temperature dehydration is conceived as a simultaneous and coupled process of simultaneous heat and mass transport, with coupled reaction phenomena occurring such as texturization, flavor development, and color development. Major mechanisms for mass (i.e. moisture) transport include convection and diffusion. There are three moisture phases that are involved in the mass transport: free liquid, vapor, and bound absorbed water. Major mechanisms for enthalpy transport include both conduction and convection. The mass and enthalpy transport mechanisms are coupled according to thermodynamic phase equilibrium constraint; moisture vaporization rates are also governed by the phase equilibrium constraint. The pertinent chemical reactions are generally a function of product integrated temperature-time history, and are thus coupled to the on-going mass and enthalpy transport. Texturization is generally associated with phenomena such as protein denaturation and starch gelatinization, and color/flavor development are associated with reaction phenomena such as nonenzymatic Maillard Browning of selected amino acids and sugars, and paralysis of complex carbohydrates.

Mathematical modelling for application to high temperature convection dehydration of food granules employs simplifying assumptions to proceed with the mathematical description of the governing simultaneous and coupled heat and mass transport and associated reaction kinetics. The following are the assumptions employed in the development of both the microscopic and macroscopic level models:

a. Food granule to food granule conduction is negligible. Uniform packed bed conditions are in effect.
b. Food granule volume change is negligible during the dehydration process. Food granule specific surface area is constant. Packed bed porosity is constant.
c. Food granule shape is spherically approximated. A uniform, homogeneous granule microstructure exists throughout the contact period.
d. Vapor-liquid phase equilibria is defined at the food granule surface only. Equilibrium is attained instantly at the surface.
e. Heat and mass transfer between the food granule and the surrounding airstream is governed by a convective boundary condition.
f. The packed bed transport and airflow circulation are "plug" flow in nature.
g. Food granule mass and enthalpy transport are unidimensional in the spherical radial dimension.
h. A convective enthalpy is associated with the mass transport of moisture within the food granule.
i. The enthalpy of superheated water vapor for the "bound" absorbed case is empirically determined as a function of food granule moisture content and temperature.
j. The dehydration overall physical system compartment walls are adiabatic with negligible heat capacity.
k. The macroscopic level packed bed and overall system mass and enthalpy balances can be adequately described employing steady state principles.

The governing theory and equations for the high temperature convection dehydration of a moving packed bed of food granules is presented at three distinct system levels: a microscopic food product based model describing the heat/mass transport and physical/chemical phenomena occurring within and at the surface of the individual food granule; a macroscopic packed bed model describing the heat and mass transfer between the food granules and the through circulation airstream; a macroscopic overall physical system model describing the mass and enthalpy balances for the overall dehydration system.

The governing conservation of mass and enthalpy balance equations will be presented separately below for each of the three physical sub-systems. Particular attention will be addressed at the microscopic level describing pertinent reaction phenomena such as texturization, flavor development, and color development. A generalized reaction kinetics mechanism modelling approach will be utilized for this purpose. Governing thermodynamics including component enthalpy functions and phase equilibria relations will then be described. Pertinent transport phenomena such as the detailing of the convective heat and mass transport phenomena will be focused on at the microscopic level. Physical, chemical, and transport property prediction methods will be utilized in the mathematical description of all the physical sub-system levels.

I. MICROSCOPIC SYSTEM

The conservation of mass balance for the food granule during high temperature dehydration is developed with respect to total moisture. No distinction is made with respect to phase in this balance. Thus, spherical coordinates are employed in the development of the food granule mass and enthalpy balance conservation equations. Mass and enthalpy transport is assumed unidimensional in the spherical radial direction in the development of the food granule conservation equations. The conservation of mass equation is as follows:

$$\partial/\partial t(\rho h2oT) = -1/r^2 \cdot \partial/\partial r(r^2 \cdot \overline{N}_{h2oT}) + \overline{S} \quad (1)$$

$$\partial/\partial t(\rho h2oT) = -1/r^2 \cdot \partial/\partial r(r^2 \cdot D h2oT - G \cdot \partial \rho H2oT\partial/\partial r) + \overline{S} \quad (2)$$

Equation (2) is a dynamic mass balance wherein the term on the left hand side of the equation is the rate of accumulation of total moisture per unit volume for the food granule at any arbitrary position in the granule. The first term on the right hand side of equation (2) represents the input and output total moisture volumetric diffusion rates for the food granule at any arbitrary position in the granule.

The total moisture diffusion rate is governed by the diffusivity of moisture in the food granule ($D_{h2oT-G}$) as a function of moisture content and temperature. The term $\bar{S}$ on the right hand side of equation (2) represents the rate of additional moisture contribution per unit volume for the granule at any arbitrary position. Evaluation of the source term $\bar{S}$ is dependent on granule position as follows:

Internal food granule positions: $\bar{S} = 0$ (3)

food granule surface: $\bar{S} = h\ conv$
$mass \cdot \bar{a} \cdot (\rho h2o^*(v)_S - \rho h2o(v)_B)$ (4)

At the granule surface, mass transfer is controlled by a convective boundary condition as represented in equation (4). The surface convection is governed by a convective mass transfer coefficient, $h\ conv\ mass$ and the driving force for surface moisture removal, $(\rho h2o^*(v)_S - \rho h2o(v)_B)$. The equilibrium h2o vapor concentration at the surface, $\rho H2o^*(v)_S$, is determined from the governing vapor-liquid equilibria and $\rho h2o(v)_B$ represents the surrounding bulk airstream h2o vapor concentration. The term $a$ in equation (4) is the food granule surface area per unit packed bed volume.

The conservation of enthalpy balance for the food granule during high temperature dehydration is analogous in form to the conservation of mass equation. Enthalpy transport is assumed to be uni-dimensional in the spherical radial direction, as previously employed in the conservation of mass case. The conservation of enthalpy equation is as follows:

$$\partial/\partial t(\rho_G \cdot C_{PG} \cdot T_G) = -1/r^2 \cdot \partial/\partial r(r^2 \cdot q_r) + \bar{S} \quad (5)$$

$$\partial/\partial t(\rho_G \cdot C_{PG} \cdot T_G) = -1/r^2 \cdot \partial/\partial r(r^2 \cdot k_G \cdot \partial T_G/\partial r) + \bar{S} \quad (6)$$

on the right-hand side of equation (8). The surface heat convection is governed by a convective heat transfer coefficient, $h\ conv\ heat$ and the driving force for surface enthalpy change, $(T-T)$. In addition, there is a convective enthalpy associated with the mass transport of moisture as expressed by the third and fourth terms on the right-hand side of equation (8).

b. Reaction Kinetics Model

A generalized reaction time integral approach is employed to establish kinetics models to characterize pertinent chemical reactions occurring in the food granule during the high temperature dehydration process. Reaction rate dependence on parameters of pertinence to dehydration such as food moisture content and temperature provides the coupling relationship of simultaneous heat and mass transport to chemical reaction kinetics. Typical chemical reactions of importance include non-enzymatic browning of amino acids/reducing sugar systems, protein denaturation texturization involving unglobularization and subsequent interaction of alpha-amino acids, and nutrient/vitamin degradation.

To illustrate the development of a generalized reaction kinetics model, the non-enzymatic browning reaction mechanism will now be considered. Non-enzymatic browning typically follows zero or first order kinetics. Selecting a first order reaction mechanism, the reaction rate expression is as follows:

$$\bar{R} = dC/dt = K \cdot C \quad (9)$$

The specific rate constant K is a function of temperature and can be expressed according to absolute reaction-rate theory for the browning reaction, wherein there is a relevant activated complex in equilibrium with the browning reactants (i.e. typically the browning reaction proceeds with both primary and secondary decomposition reactions). The transition state rate constant expression is as follows:

$$K = ko \cdot \exp(-E_{ACT}/(R \cdot T_G)) \cdot T_G \quad (10)$$

The rate constant K is dependent on the Arrhenius activation energy factor, the food granule temperature, and a frequency constant ko. Substituting equation (10) into equation (9) and integrating results in the following:

$$\int_{c_o}^{c} \frac{dc}{c} = ko \cdot \int_{t_o}^{t} T_G \cdot \exp(-E_{ACT}/(R \cdot T_G)) \cdot dt \quad (11)$$

The integral term on the right-hand side of equation (11) can be interpreted as a generalized reaction time history or thermal time, $\tau$, governed by an activation energy, $E_{ACT}$. Proceeding with the integration, the fractional conversion for the browning reaction can be determined and is as follows:

$$\bar{X} = 1 - c/c_o = 1 - \text{EXP}(-ko \cdot \tau) \quad (12)$$

In equation (12), $\bar{X}$ represents the fractional conversion for the browning reaction, ko is the absolute frequency constant, and $\tau$ is the thermal time as defined in equation (11).

Employing the generalized reaction time integral approach to determine the kinetics parameters for the browning of peanuts during high temperature convection roasting resulted in the following first order parameters: $ko = 2.083 \times 10-14$ $\sec^{-1} \cdot deg$ $k^{-1}$; $E_{ACT} = 1.294 \times 10+8$ J/Kgmole. A linear regression procedure of $\bar{X}$ experimental versus $\tau$ predicted at different activation energy levels was performed to determine the aforementioned "best fit" kinetics parameters.

Heat and mass transfer between the food granule and the contactive airstream in the packed bed is governed by a convective boundary condition. The governing convective heat and mass transfer coefficients are determined to quantify the convective boundary condition.

A semi-empirical correlation based on experimental heat and mass transfer in packed beds is employed to determine the convective heat transfer coefficient as follows:

Equation (6) is a dynamic enthalpy balance wherein the term on the left hand side of the equation is the rate of accumulation of total enthalpy per unit volume at any arbitrary position in the granule. The first term on the right hand side of equation (6) represents the input and output conduction heat transfer volumetric rates at any arbritrary position in the granule.

The conduction heat transfer within the food granule is governed by the thermal conductivity of the food granule ($k_G$) as a function of food granule composition and temperature. The term $\bar{S}$ on the right hand side of equation (6) represents the volumetric rate of additional heat generation and/or transfer contribution for the granule at any arbritrary position. Evaluation of the enthalpy source term $\bar{S}$ is dependent on granule position as follows:

Internal food granule positions:

$$\bar{S} = {}^h h2o(v) \cdot (\varepsilon \partial h2oT/\partial t) + \Delta H'_{RCT} \quad (7)$$

the granule surface:

$$\bar{S} = h\,conv\,heat \cdot \bar{a} \cdot (T_{GS} - T_{aB}) + \Delta H'_{RCT} + {}^h h2o(v) \cdot (-1/r^{2} \cdot \partial/\partial r(r^{2} \cdot k_{G} \cdot \partial T_{G}/\partial r)) + {}^h h2o(v) \cdot (h\,conv\,mass \cdot \bar{a} \cdot (ph2o^{*}(v)_{S} - ph2o(v)_{B})) \quad (8)$$

At the internal granule position, there is a convective enthalpy associated with the mass transport of moisture, which is expressed by the first term on the right hand side of equation (7). $^h h2o(v)$ represents the specific enthalpy of superheated h2o(v)·$\Delta H'_{RCT}$ represents the heat(s) associated with pertinent chemical reactions occurring during the high temperature dehydration process.

At the granule surface, heat transfer is controlled by a convective boundary condition as represented by the first term $$j_H = (h\,conv\,heat/(C_{pa} \cdot Ga)) \cdot N_{Pr}^{\frac{2}{3}} = l \cdot N_{Re}^{-.41} \cdot \psi \quad (13)$$

The Reynolds number $N_{Re}$, and the Prandtl number, $N_{Pr}$, in equation (13) for the Colburn $j_H$ factor, are determined as follows:

$$N_{Re} = Ga/(a \cdot \mu_a \cdot \psi) \quad (14)$$

$$N_{Pr} = C_{pa} \cdot \mu_a / k_a \quad (15)$$

Ga is the superficial air mass velocity, determined as $$Ga = v_a \cdot \rho_a \quad (16)$$

and a is the granule surface area per unit packed bed volume, defined as:

$$a = (\rho_{bed}/\rho_G) \cdot (Area_G/Volume_G) \quad (17)$$

For a spherical granule system, $a = (\rho_{bed}/\rho_G) \cdot 3/R_G$ (18)

and $\psi$ is evaluated as 1.0.

l is a parameter determined by adaptive model tuning practice based on minimizing predicted vs. observed least squares difference for food granule moisture content and temperature.

Equation (13) can be rearranged to solve for the convective heat transfer coefficient, resulting in the following equation for h conv heat:

$$h\,conv\,heat = l \cdot N_{Re}^{-.41} \cdot C_{pa}^{\frac{1}{3}} \cdot (k_a/\mu_a)^{\frac{2}{3}} \cdot v_a \cdot \rho_a \cdot \psi \quad (19)$$

The convective heat transfer coefficient parameter, l, was determined to be 1.73 for convective packed bed nut roasting, based on predicted vs. observed adaptive model tuning. The convective heat transfer coefficient is 40–45 W/m²-deg K. for a peanut packed bed high temperature convection roasting system employing operating conditions of 422 deg K inlet air, $N_{Re} = 150$, $N_{Pr} = 0.9$, and $G_a = 1.224$ kg dry air/m²-sec.

The convective mass transfer coefficient, h conv mass, is determined from the Chilton Colburn analogy as follows:

$$h\,conv\,mass = h\,conv\,heat/(C_{pa} \cdot \rho_a \cdot (N_{Sch}/N_{Pr})^{\frac{2}{3}}) \quad (20)$$

Pertaining to the aforementioned illustrated example for the convective heat transfer coefficient, the convective mass transfer coefficient is determined to be 0.054–0.062 m/sec, with the dimensionless Schmidt number, $N_{Sch} = 0.7$.

Vapor-liquid phase equilibria is defined at the surface of the food granule only. Equilibrium is assumed instantaneous at the surface during the high temperature dehydration process. Employing the above statement of equilibrium, the chemical potential of the moisture in the food granule liquid phase at the surface is equal to the chemical potential of the water vapor phase as follows:

$$\mu_{liquid\,S} = \mu_{vapor\,S} \quad (21)$$

$$\bar{f}_{liquid\,S} = \bar{f}_{vapor\,S} \quad (22)$$

At the granule surface, the liquid moisture is assumed being in a "free" as opposed to "bound" state. Equation (22) can be re-expressed as follows to provide a direct solution of the equilibrium water vapor pressure, $Ph2o^{*}(v)$, at the granule surface:

$$a^{*}h2oL\text{-}granule = Ph2o^{*}(v)/Ph2oSAT$$
$$L = Xh2oL \cdot \gamma h2oL\text{-}granule \quad (23)$$

wherein $a^{*}h2o$ L-granule represents the water-granule liquid phase $\chi h2o$ L represents the equilibrium, water mole fraction in the food granule liquid phase, $\gamma h2o$ L-granule represents the activity coefficient for the water-granule liquid phase, and $Ph2o$ SAT L represents the moisture saturation pressure in the food granule liquid phase. The equilibrium water vapor concentration at the food granule surface, $PH2o^{*}(v)_S$, is directly determined from the equilibrium water vapor pressure by employing the ideal gas law as follows:

$$Ph2o^{*}(v)_S = Ph2o(v) \cdot MW_{h2o}/(R \cdot T_{GS}) \quad (24)$$

$Ph2o^{*}(v)_S$ is employed to establish the convective mass transfer driving force at the granule surface during high temperature dehydration. The activity coefficient for the water-granule liquid phase, $\gamma h2o$ L-granule, is determined by employing a Van Laar equation approach. The Gibbs-Duhem equation is employed to determine the activity coefficient from the Van Laar expressed excess free energy, resulting in the following equation:

$$\gamma h2o\,L\text{-}granule = EXP(\bar{A}/(1+\bar{A}/\bar{B} \cdot (Xh2o\,L/(1-Xh2o\,L)\,))^{2}) \quad (25)$$

wherein $$Xh2o\,L = {}^{\omega}h2o/MW_{h2o}/({}^{\omega}h2o/MW_{h2o} + (1-{}^{\omega}h2o)/MW_G) \quad (26)$$

Parameters $\bar{A}$ and $\bar{B}$ in equation (25) represents system nonideality (e.g. molecular interactions). The saturation water pressure in the granule liquid phase, $ph2o$ SAT L, is determined from the Antoine equation [16] as follows:

$$Ph2o\,SAT\,L = \bar{d} \cdot EXP(\bar{a} + \bar{b}/(T_G - +\bar{c})) \quad (27)$$

For the peanut high temperature convection roasting system of the present invention, the following are experimentally determined Van Laar equation parameters (based on equilibrium moisture content vs. relative humidity vs. temperature experimental data) and the applicable Antoine equation parameters, respectively:

| | | | |
|---|---|---|---|
| $\bar{A} = -0.01115$ | $\bar{B} = 0.02094$ | $MW_G = 1203.8$ | |
| $\bar{a} = 18.3$ | $\bar{b} = -3816.4$ | $\bar{c} = -46.13$ | $\bar{d} = 133.37$ |

Determination of the enthalpy of superheated water vapor is required for both "free" and "bound" moisture states. The enthalpy of superheated water vapor for the "free" state (e.g. assumed state at the food granule surface) is a function of temperature only and is determined as follows:

$$^h h2o(v) \text{latent free} = h \text{ vap ref} \cdot ((^T h2o \text{ crit} - T_g)/(^T h2o \text{ crit} - T \text{ ref}))^{0.38} \quad (28)$$

$$^h h2o(v) \text{free} = {^h h2o(v)} \text{latent free} + ((^{CP} h2o L + 4183.1)/2) \cdot (T_G - 298) \quad (29)$$

Equation (28) employs Watsons correlation to determine the latent heat of vaporization at any temperature, $T_G$, with knowledge of the latent heat, $^h$vap ref, at a reference temperature, T ref. The enthalpy of superheated water vapor for the "free" state, $^h$h2o(v) free, is determined from the equation (28) latent heat and is temperature compensated as shown in equation (29).

The enthalpy of "bound" state superheated water vapor is dependent upon both food granule moisture content and temperature. The lower the food granule moisture content and temperature, the higher will be its enthalpy of superheated water vapor. A semi-empirical approach developed by Othmer [3, 8], employing equilibrium moisture data to determine the "bound" state food granule heat of vaporization is utilized. The Othmer based equation for the "bound" water heat of vaporization, $^h$h2o(v) latent bound, is as follows:

$$^h h2o(v) \text{latent bound} = {^h h2o(v)} \text{latent free} \cdot (\ln {^P h2o(v)}/{^P h2 SAT L}) + (q) \quad (30)$$

The constant q and the ($^h$h2o(v) latent bound/$^h$h2o(v) latent free) ratio are determined via regression of experimental $\ln {^P}$h2o(v) vs $\ln {^P}$h2o SAT L data for multiple granule moisture contents within the range of dehydration interest. The resulting slope is the bound water vapor pressure/free water vapor pressure ratio and the intercept is ln (q·$^P$h2o SAT L).

The "bound" enthalpy of superheated water vapor is determined from the "bound" latent heat as presented in the following equation:

$$^h h2o(v) \text{bound} = {^h h2o(v)} \text{latent bound} + ((^{CP} h2o L + 4183.1)/2) \cdot (T_G - 298) \quad (31)$$

Physical and transport property prediction methods are required to solve both the microscopic and macroscopic levels conservation of mass and enthalpy balances.

At the microscopic level, the following physical and transport property prediction methods are of particular pertinence to the food granule during the high temperature dehydration process:

The food granule specific heat, $Cp_G$ is adequately determined employing a mass average of the individual food component specific heats as follows:

$$Cp_G = \Sigma^C P \text{component} \cdot {^\omega}\text{component, dry basis} \quad (32)$$

$$Cp_G = (1422.3 \cdot {^\omega}\text{carbohydrate dry} + 1547.7 \cdot {^\omega}\text{protein dry} + 1673.2 \cdot {^\omega}\text{fat dry} + 836.6 \cdot {^\omega}\text{ash/inert dry} + 4183.1 \cdot {^\omega}\text{h2o dry}) \quad (33)$$

Note that the above "additive" model does not account for interactions between food group components and assumes the same specific heat for food component sub-groups. As an example, the predicted peanut specific heat at 5% dry basis moisture content is 1798.7 J/(kg dry —deg K), which agrees well with reported literature values.

The food granule thermal conductivity, $k_G$, is also adequately determined employing a mass average, "additive" model technique, with added temperature compensation, determined empirically:

$$k_G = \Sigma^K \text{component} \cdot {^\omega}\text{component, dry basis} + \text{const} \cdot (T_G - T \text{ ref}) \quad (34)$$

$$k_G = 0.228 \cdot {^\omega}\text{carbohydrate dry} + 0.168 \cdot {^\omega}\text{fat dry} + 0.178 \cdot {^\omega}\text{protein dry} + 0.135 \cdot {^\omega}\text{ash dry} + 0.595 \cdot {^\omega}\text{h2o dry}) + 8.91 \times 10 - 4 \cdot (T_G - 298) \quad (35)$$

As in the case of the specific heat model, the thermal conductivity model assumes no interaction effects and requires "pure" component conductivity updating for specific sub-groups (e.g. proteins, carbohydrates). As an example, the peanut thermal conductivity at 5% dry basis moisture content and 310 deg K temperature is 0.21 W/m —deg K which also agrees well with reported literature values.

The food granule total moisture diffusivity or diffusion cooefficient (h2o T—G) is described as a function of both temperature and total moisture content. The following proposed equation accounts for a modified Arrhenius temperature relationship, in addition to the moisture content effect:

$$D\text{h2o } T - G = A \cdot \text{EXP} (B + C \cdot {^\omega}\text{h2o } T \text{ dry} + D'/T) \quad (36)$$

The D' term physical significance in equation (36) is related to the energy of activation for diffusion. For the peanut convection roasting system, reported diffusivity data at different moisture contents and temperatures [1, 19] was employed to conduct non-linear regression procedure and determine equation (36) parameters as follows:

$$A = 4.904 \times 10 - 5 \; B = 4.7 \; C = 55.7 \; D' = -4500.0$$

As an example, the predicted total moisture diffusivity for the peanut during the high temperature convection roasting process at 5% dry basis moisture content and 305 deg K temperature is $4.645 \times 10 - 8$ m²/sec, which compares well with the reported diffusivity data.

The following physical and transport property prediction methods are of particular pertinence to the macroscopic level packed bed and the overall physical system during the high temperature dehydration process:

The packed bed void fraction, $\epsilon$, is a function of the food granule absolute density and the packed bed density as follows:

$$\epsilon = \text{volume void/volume bed} = (p\text{absolute} - p\text{bulk})/p\text{absolute} \quad (37)$$

For example, the packed bed void fraction is 0.41 for a peanut packed bed convection system, with absolute nut and packed bed bulk densities of 1129.4 and 662.6 kg/m³, respectively.

The effective granule diameter (for nonspherical granules) is defined as follows:

$$D_g = 4 \cdot R_{hydraulic} = 4 \cdot (\epsilon/(1-\epsilon)) \cdot V_a/S_a \qquad (38)$$

wherein the granule volume, $V_a$, and the granule area, $S_a$, are measured. As an example, the effective peanut granule diameter employed for convection roasting is 9.45 mm.

Transport and physical property data pertaining to air-water vapor mixtures is of major pertinence to both the packed bed and overall physical system macroscopic level conservation of mass and enthalpy equations. The following are the applicable physical and transport property prediction methods:

The air-h2o vapor mixture viscosity, $\mu_{air-h2o(v)}$, is obtained from the following modified molar basis pure gaseous component weighted averaging:

$$\mu_{air-h2o(v)} = \Sigma(\mu_{comp\ i} \cdot Y_{comp\ i} \cdot Mw_{comp\ i}^{0.5})/\Sigma(Y_{comp\ i} \cdot Mw_{comp\ i}^{0.5}) \qquad (39)$$

Each pure component (i.e. $O_2$, $N_2$, h2o, $CO_2$) gaseous viscosity in equation (39) is temperature corrected according to the following equation:

$$\mu_{comp\ i,\ temp\ Ta} = \mu_{comp\ i,\ T\ ref} \cdot (T_a/T_{ref})^{1.5} \cdot ((T_{ref} + 1.47 \cdot T_{bp})/(T_a + 1.47 \cdot T_{bp})) \qquad (40)$$

The air-h2o(v) system pure gaseous component(s) viscosity at reference temperature is readily available from chemical engineering physical property data sources.

The air-h2o vapor mixture density, $\rho_{air-h2o(v)}$, is readily determined from use of the ideal gas law, assuming ideal gas behavior which is generally valid at low system operating pressures (i.e. less than 101.4 kPa absolute). The following equation is employed to determine the air-h2o(v) mixture density:

$$\rho_{air-h2o(v)} = P_T/(R \cdot T_a \cdot (1 + (H \cdot Mwa/MWh2o))) \qquad (41)$$

The resulting $\rho_{air-h2o(v)}$ represents the dry mass of air per volume of moist air (i.e. kg dry air/m³ moist air).

The air-h2o vapor mixture specific heat, $Cp_{air-h2o(v)}$, is determined from a mass average weighting of the individual gaseous component specific heats as follows:

$$Cp_{air-h2o(v)} = \Sigma Cp_{component} \cdot y_{component} \qquad (42)$$

The pure component gas specific heats are temperature corrected according to the following equation:

$$Cp_{comp\ i,\ temp\ Ta} = a_0 + b_0 \cdot T_a + c_0 \cdot T_a^2 + d_0 \cdot T_a^3 \qquad (43)$$

Refer to for equation (43) constants for the pure components (e.g. $O_2$, $N_2$, h2o, $CO_2$) in the air-h2o(v) mixture. Equation (43) and the pure component constants are valid over a wide temperature range (e.g. 273–3800 Deg K.), encompassing the typical high temperature dehydration operating range.

The air-h2o(v) mixture thermal conductivity, k air-h2o(v), is obtained from the following modified method of molar basis pure gaseous component weighted averaging:

$$k_{air-h2o(v)} = \Sigma(K_{comp\ i} \cdot y_{comp\ i} \cdot Mw_{comp\ i}^{0.33})/\Sigma(y_{comp\ i} \cdot Mw_{comp\ i}^{0.33}) \qquad (44)$$

Each pure component (i.e. $O_2$, $N_2$, h2o, $CO_2$) gaseous thermal conductivity in equation (44) is temperature corrected according to the following empirically based equation [13]:

$$k\ comp\ i,\ temp\ T_a = a' + b' \cdot T_a \qquad (45)$$

The constants a and b in equation (45) are as follows for the pure gaseous components in the air-h2o(v) system:

| component | a | b |
|---|---|---|
| $O_2$ | $6.71 \times 10^{-5}$ | $1.19 \times 10^{-2}$ |
| $N_2$— | $6.00 \times 10^{-5}$ | $1.53 \times 10^{-2}$ |
| h2o | $1.05 \times 10^{-4}$ | $-2.89 \times 10^{-2}$ |
| $CO_2$ | $7.96 \times 10^{-5}$ | $-1.32 \times 10^{-2}$ |

The diffusivity of h2o(v) in air is $2.20 \times 10^{-5}$ m²/sec at a reference temperature of 273 deg K. [13]. The gas diffusivity generally varies with absolute temperature to the 1.5 power as illustrated in the following equation:

$$D_{air-h2o(v),\ temp\ Ta} = D_{air-h2o(v),\ temp\ T\ ref} \cdot (T_a/T_{ref})^{1.5} \qquad (46)$$

The 1.5 power temperature dependence originates from the kinetic theory of gases.

Conservation of mass and enthalpy balances are developed for the macroscopic level cross-flow packed bed system subjected to high temperature dehydration. Consider a unit volume of this packed bed subjected to crossflow aeration. Assuming steady state behavior, the conservation of mass and enthalpy balances can be developed for a differential control volume (S·DX). Proceeding with the conservation of mass equations, two different but equivalent approaches are available: one approach equates the moisture convection from the food granule surfaces in the packed bed with the change in humidity of the circulating airflow through the packed bed, while an alternative approach is to equate the moisture change of the food granules in the packed bed with the change in humidity of the through circulation airflow through the packed bed.

Selecting the first approach mentioned above, the macroscopic packed bed mass balance is as follows:

$$G_a \cdot S \cdot \partial H/\partial X \cdot DX = h\ conv\ mass \cdot \bar{a} \cdot (\rho h2o^*(v)_S - \rho h2o(v)_B) \cdot S \cdot DX \qquad (47)$$

Equation (47) can be easily re-arranged to solve for the differential change in air humidity as a function of packed bed vertical depth position (e.g. difference between humidity of air entering the packed bed at any bed position X vs. humidity of air at any packed bed position X+DX ), as presented in equation (48):

$$\partial H/\partial X = (h\ conv\ mass \cdot \bar{a} \cdot (\rho h2o^*(v)_S - \rho h2o(v)_B))/G_a \qquad (48)$$

Proceeding now with the conservation of enthalpy equation for the packed bed physical system, as in the aforementioned conservation of mass balance case, two distinct approaches can be employed to develop the conservation of enthalpy equation. One approach equates the enthalpy difference of the circulating air into and out of a differential element of the packed bed control volume with the enthalpy transferred by convection (+) the enthalpy of superheated h2o vapor associated with the change in air humidity, $\partial H$. The second approach equates the enthalpy transferred by convection from the air to the packed bed food granules with the sum of enthalpies for the packed bed food granules sensible heat, latent heat, and evaporated h2o vapor sensible heat. Both conservation of enthalpy balance approaches are equivalent, as in the case of the conservation of mass balance, wherein the end results for the two approaches are identical. Illustrating the first approach only, the conservation of enthalpy balance for the packed bed differential control volume is as follows below:

The enthalpy difference of the circulating air into the packed bed control volume at any position X and out of the packed bed at any position X+DX is expressed in the following equation:

$$dh = G\,a\cdot((Cp\,dry\,air + Cp\,h2o(v)\cdot H\cdot T\,a + {}^h h2o(v) latent\cdot H)\cdot S(-)\,G\,a\cdot((Cp\,dry\,air + Cp\,h2o(v)\cdot(H + \partial H/\partial X\cdot DX))\cdot(T\,a + \partial T\,a/\partial X\cdot DX) + {}^h h2o(v) latent\cdot(H + \partial H/aX\cdot DX))\cdot S \quad (49)$$

Rearranging equation (49) and combining like terms results in the following equation for the differential enthalpy change of the circulating air into the packed bed at position X and out of the packed bed at position X+DX:

$$dh = G\,a\cdot S\cdot DX\cdot(Cp\,dry\,air\cdot\partial T\,a/\partial X + {}^h h2o(v) latent\cdot \partial H/\partial X + Cp\,h2o(v)\cdot(H\cdot\partial T\,a/\partial X + \partial H/\partial X\cdot(T\,a + \partial T\,a/\partial X\cdot DX))) \quad (50)$$

The differential enthalpy transferred by convection (+) the differential enthalpy of superheated h2o vapor associated with the change in air humidity, $\partial H$, is represented as follows:

$$((h\,conv\,heat\cdot\hat{a}\cdot(Ta - T_{GS})) + (Ga\cdot({}^h h2o(v) latent + Cp\,h2o(v)\cdot T_{GS})\cdot\partial H/\partial X)\cdot S\cdot DX \quad (51)$$

Equating the expression for dh in equation (50) with the differential enthalpy terms expressed in (51), and combining like terms and re-arranging results in the following expression for the differential change in packed bed air temperature as a function of vertical packed bed depth position (e.g. difference between temperature of air at packed bed depth position X vs. temperature of air at packed bed depth position X+DX:

$$\partial T\,a/\partial X = ((h\,conv\,heat\cdot\hat{a}/Ga)\cdot(T\,a - T_{GS}) + \partial H/\partial X\cdot(Cp\,h2o(v)\cdot(Ta - T_{GS})))/(Cp\,dry\,air + Cp\,h2o(v)\cdot(H + \partial H/\partial X\cdot DX)) \quad (52)$$

The differential change in air humidity as a function of packed bed depth position is determined in the packed bed mass balance, equation (48). Thus the macroscopic level packed bed conservation of mass and enthalpy equations (48) and (52) are coupled by this requirement.

Conservation of mass and enthalpy balances are developed for the macroscopic level overall forced convection dehydration system. As discussed earlier, a multiple compartment forced convection system with independent compartment operating controls of inlet air temperature and humidity, and bed air velocity is representative of the macroscopic level overall dehydration system.

Consider a process flow a typical compartment in this forced convection dehydration system. Assuming steady state behavior, the conservation of mass and enthalpy balances can be developed for a compartment control volume. Proceeding with the conservation of mass equations, both dry component and h2o component mass balances can be developed. The dry component mass balance, for the overall system is as follows:

(Note that the macroscopic overall system level conservation of mass and enthalpy balance equations are expressed in an integrated form, i.e. integrated over the dehydration compartment control volume in a steady state manner.)

$$\dot{m}\,amba_{dry} + \dot{m}f_{dry} - \dot{m}ia_{dry}\cdot(1 - R_e) = 0 \quad (53)$$

The h2o component mass balance is developed at the burner flue gases entry point location of the physical system.

$$\dot{m}f_{dry}\cdot Hf + (\dot{m}ia_{dry}\cdot(1 - (1 - R_e))\cdot Hoa) + \dot{m}amba_{dry}\cdot Hamba - \dot{m}ia_{dry}\cdot Hia = 0 \quad (54)$$

Employing both the dry component and h2o component mass balances, equations (53) and (54), the absolute humidity of the heated inlet air to the compartment, Hia, can be determined. After re-arranging and combining of like terms, the following expression for Hia is derived:

$$Hia = Hamba + (R_e/(1 - R_e))\cdot\Delta H + (\dot{m}f_{dry}\cdot(Hf - Hamba))/(\dot{m}ia_{dry}\cdot(1 - R_e)) \quad (55)$$

wherein $\Delta H = Hoa - Hia$. The decimal fraction recirculation, $R_e$, can vary from 0 to 1, wherein 0 represents no recirculation of dehydration system exhaust and 1 represents the extreme condition of 100% re-circulation, without exhaust removal. Typically, high temperature dehydration decimal fraction recirculation ratios are in the 0.25–0.90 range, depending on specific process requirements. $\Delta H$ information is obtained from the packed bed macroscopic level conservation of mass balance, equation (48), previously described. The solution and coupling iterative convergence procedure between the two macroscopic system levels will be described later.

The conservation of enthalpy balance for the overall dehydration system is to be developed at the burner flue gases entry point location of the physical system. The conservation of enthalpy balance is as follows:

$$\dot{Q}amba + \dot{Q}f + \dot{Q}.ra - \dot{Q}ia = 0 \quad (56)$$

Equation (56) represents the steady state macroscopic overall dehydration system enthalpy balance at the burner flue gases entry point, summing all stream enthalpy contributions including make-up/ambient air ($\dot{Q}amba$), flue gases at the flame temperature ($\dot{Q}f$), recirculating air ($\dot{Q}ra$), and dehydration process inlet air, ($\dot{Q}ia$). Equation (56) can be re-expressed as follows:

$$\dot{m}amba \cdot Cpamba \cdot (Tamba - Tref) + \dot{m}f \cdot Cpf \cdot (Tflame - Tref)(+)\dot{m}ia \cdot (1 - (1 - R_e)) \cdot Cpoa \cdot (Toa - Tref) - \dot{m}ia \cdot Cpia \cdot (Tia - Tref)(+)\dot{m}ia \cdot (Hoa - Hia) \cdot {}^h h2o(v)\,latent = 0 \quad (57)$$

Note that in equation (57), $Hoa - Hia = \Delta H$, wherein $\Delta H$, the change in air absolute humidity for the macroscopic packed bed system, is determined from the equation (48) packed bed macroscopic level mass balance. The two macroscopic levels are thus coupled with respect to the above requirement. As mentioned earlier, the iterative and sequential convergence scheme to solve this coupling arrangement will be discussed later.

In the equation (57) enthalpy balance, T ref is the basis temperature and is selected as 273 deg K. (0 deg C.). The adiabatic flame temperature, T flame, depends directly on the fuel gas composition and is directly determined from the low heating value of the fuel gas (i.e. heat produced at constant pressure by the complete combustion of fuel gas to h2o(v) and $CO_2$(g) products). The low heating value is actually the enthalpy of the flue combustion products evaluated at the flame temperature; the flame temperature is thus determined by performing an adiabatic combustion system enthalpy balance. Typically, for Eastern U.S.A natural gas, the flame temperature in air is 2227 deg K. and the low heating value is $3.765 \times 10+7$ J/m$^3$ (289 deg K., $1.014 \times 10+5$ Pa, dry).

In equation (57), the specific heat terms can be expressed as follows:

$$Cp\ ia \cdot Cp\ dry\ air + Hia \cdot Cp\ h2o(v) \qquad (58a)$$

$$Cp\ oa \cdot CP\ dry\ air + Hoa \cdot Cp\ h2o(v) \qquad (58b)$$

Cp f represents the flue heat capacity expressed on a wet basis as J/kg-deg K.

The equation (57) conservation of enthalpy balance can be expanded and simplified to derive the following equation for the dehydration process inlet air temperature (T ia):

$$T\ ia = -(B_e \cdot Tflame + C_e \cdot T\ amba + E_e \cdot \Delta T\ a + D_e)/A_e \qquad (59)$$

wherein:

$$A_e = \dot{m}ia \cdot ((R_e - 1) \cdot Cp\ dry\ air + Cph2o(v) \cdot ((R_e - 1) \cdot \qquad (60)$$
$$Hia + R_e \cdot \Delta H)) - \dot{m}f \cdot Cpf$$

$$B_e = \dot{m}f \cdot Cpf$$

$$C_e = (\dot{m}ia \cdot (1 - R_e) - \dot{m}f) \cdot (Cp\ dry\ air + Hamba \cdot Cph2o(v))$$

$$D_e = (((\dot{m}ia \cdot (1 - R_e) - \dot{m}f) \cdot Hamba) + \dot{m}ia \cdot ((R_e - 1) \cdot$$
$$Hia + R_e \cdot \Delta H)) \cdot {}^hh2o(v)\ latent$$

$$E_e = \dot{m}ia \cdot R_e \cdot (Cpamba + (\Delta H + Hia) \cdot Cph2o(v))$$

Equations (55) and (59) constitute the macroscopic overall system level conservation equations to determine the packed bed inlet air humidity and temperature. The solution of the mass and enthalpy equations is performed via a coupled and sequential iterative approach.

Note that in equation (59), $\Delta T\ a = T\ oa - T\ ia$, wherein $\Delta T\ a$, the change in circulating air temperature for the macroscopic packed bed system, is determined from discretization/packed bed control volume integration of the equation (52) packed bed macroscopic level enthalpy balance. The two macroscopic levels are notably coupled with respect to the above. As mentioned earlier, the iterative convergence scheme to solve this macroscopic packed bed/overall system coupling arrangement will be discussed later.

Equation (59) expresses the effects of the major macroscopic level process parameters on the inlet circulating air temperature to the packed bed dehydration system. As can be determined from careful inspection of this equation, the following key process parameters affect the packed bed inlet air temperature: flame temperature, T flame; ambient air temperature, T amba; ambient air humidity, Hamba; air recirculation ratio, $R_e$; inlet air humidity, Hia; packed bed outlet air humidity and temperature, Hoa and T oa; air circulation flow rate, $\dot{m}$ ia; combustion flue gases flow rate; $\dot{m}$ f. The packed bed outlet air temperature and humidity are determined from $\Delta T_a$ and $\Delta H$, and are calculated from discretization/packed bed control volume integration of the macroscopic packed bed conservation equations (48) and (52).

A unique control volume integral/discretization approach is employed to solve the sets of microscopic and macroscopic packed bed levels conservation of mass and enthalpy balance differential equations. This method allows use of non-uniform grid density and promotes easy transferrability to alternate geometry or coordinate systems. This method also accommodates readily non-linear mass and enthalpy balance terms (e.g. thermal conductivity or diffusivity dependence on temperature and moisture concentration).

Use of the control volume discretization approach is particularly well suited for application to simultaneous and coupled heat and mass transport systems. The employment of a sequential, rather than simultaneous, solution procedure to solve the sets of microscopic and macroscopic levels conservation equations is utilized. The sequential procedure is iterative in nature; discretization of conservation equations is performed at each physical system level sequentially, rather than simultaneously. This sequential, iterative process converts coupled non-linear differential equations to nominally linear equations; the equation(s) coefficients are determined and updated from previous iteration or if applicable, time-step values of the equation dependent variables (e.g. food granule temperature). The nominally linear equations for one dependent variable at a time are algebraic in nature and are solved by iterative method, rather than by direct method. Solution is attained when the convergence criterion is satisfied (e.g. further iterations do not produce any change in the dependent variable(s) values).

The sequential, iterative procedure applied to typical simultaneous and coupled heat and mass transport problems greatly reduces the required computing effort vs. the direct method simultaneous solution procedure, while by attaining equivalent accuracy. The sequential, iterative technique also solves both unsteady and steady state problems, without fundamental procedure differences. In both cases, iterations are performed at each time step until convergence criteria are satisfied. Convergence stability advantages are also inherent by use of parameter relaxation techniques during the iterative process. For e.g. the moisture diffusivity parameter can be relaxed, as follows in equation (61), to provide stable convergence of the conservation of mass balance for the food granule.

$$Dh2o\ T-G = \alpha \cdot Dh2o\ T-G_{NEW} + (1-\alpha) \cdot Dh2o$$
$$T-G_{old} \qquad (61)$$

Application of the control volume discretization technique to solve the microscopic and macroscopic level packed bed conservation equations will now be presented. Employment of this technique combined with a sequential, iterative procedure to solve the overall microscopic/macroscopic sets of coupled conservation equations will then follow. The application of adaptive, self-tuning procedures to provide for overall mathematical model optimization will be discussed later.

The microscopic level governing conservation of mass and enthalpy balances, equations (2) and (6), described earlier, are dynamic partial differential equations that are highly coupled with each other and the other macroscopic model levels. It is required to determine the food granule dependent variables (e.g. moisture content and temperature) as a function of both granule position and process time. The numerical solution technique selected to solve or integrate these partial differential equations is finite control volume discretization.

The discretization equation is obtained by integrating the governing conservation equation over a control volume to obtain the distribution of dependent variable values for a specific group of control volume grid points. It is pertinent to note that use of this procedure implies that the integral conservation laws are exactly satisfied for the control volume and holds equally for both small and very large numbers of grid points.

The discretization procedure applied to the food granule conservation of mass at any internal granule position will be illustrated as a case example. An analogous procedure is applicable to the discretization of the food granule conservation of mass at the surface position and the conservation of enthalpy balances for the food granule.

The first step to employing this technique is to formulate the control volume. According to the physical system definition given earlier, the food granules are spherically approximated, and thus a spherical control volume is formulated. Also, according to physical system definition mass and enthalpy transport are uni-dimensional; mass and enthalpy transport in the control volume radial direction is considered. The control volume surface $$\text{area is thus: } dS = d\theta \cdot d\phi \cdot r^2 = r^2 \quad (62a)$$

$$\text{and the volume is: } dV = d\theta \cdot d\phi \cdot r^2 \cdot dr = r^2 \cdot dr \quad (62b)$$

Specific attention is focused on grid point PO which has grid points NO and SO as its neighbors. NO denotes the north point (i.e. positive direction towards granule surface, away from center) while SO stands for the south point (negative direction towards granule center, away from surface). The letters no and so denote the interfaces of the control volume. Proceeding to integrate the food granule internal position conservation of mass, equation (2), over this spherical food granule control volume and over the time interval from t to $t + \Delta t$ results in the following equation:

$$\int_{SO}^{NO} \int_{t}^{t+\Delta t} (\partial \rho h2oT/\partial t) \cdot dt \cdot dV = \quad (63)$$

$$- \int_{t}^{t+\Delta t} \int_{SO}^{NO} (1/r^2 \cdot \partial/\partial r(D_{h2oT} - G \cdot r^2 \cdot \partial \rho h2oT/\partial r)) \cdot$$

$$dV \cdot dt$$

Assuming that the grid point value of $\rho h2o$ T, the total moisture concentration per granule unit volume, prevails throughout the control volume, the discretization or integration of the equation (63) left-hand side over the control volume is evaluated as follows:

$$\int_{SO}^{NO} \int_{t}^{t+\Delta t} (\partial \rho h2oT/\partial t) \cdot dt \cdot dV = \quad (64)$$

$$r^2 \cdot \Delta r \cdot (\rho h2oT_{PO}^1 - \rho h2oT_{PO}^0)$$

$\rho h2o$ $T_{PO}$ and $\rho h2oT^1_{PO}$ in equation (64) represents "old" or given grid point PO values at time t and "new" or unknown grid point PO values at the time-step $t + \Delta t$, respectively. An assumption can be made regarding the variation of the grid point values of the $\rho h2o$ T dependent variable with time from t to $t + \Delta t$. For e.g., the dependent variable time variation can be weighted as follows:

$$\int_{t}^{t+\Delta t} \rho h2oT_{PO} \cdot dt = (\beta \cdot \rho h2oT^1_{PO} + \quad (65)$$

$$(1 - \beta) \cdot \rho h2oT^0_{PO}) \cdot \Delta t$$

$\beta$ in equation (65) is a weighting factor between 0 and 1 which is utilized to "relax" or dampen the iterative updating of the dependent variable with time. For this illustration of microscopic level control volume discretization procedure, $\beta$ is taken to be 1. Proceeding now with discretization or integration of the equation (63) right-hand side over the control volume:

$$\int_{t}^{t+\Delta t} \int_{SO}^{NO} (1/r^2 \cdot \partial/\partial r(D_{h2oT} - G \cdot r^2 \cdot \partial \rho h2oT/\partial r)) \cdot \quad (66)$$

$$dV \cdot dt = ((r_{no}^2 \cdot D_{h2oT} - G_{no} \cdot (\rho h2oT^1_{NO} - \rho h2oT^1_{PO})/\Delta r_{no})(-)$$

$$(r_{so}^2 \cdot D_{h2oT} - G_{so} \cdot (\rho h2oT^1_{PO} - \rho h2oT^1_{SO})/\Delta r_{so})) \cdot \Delta t \rho h2oT^1_{NO},$$

$$\rho h2oT^1_{SO}, \text{ and } \rho h2oT^1_{PO}$$

represent the total moisture concentration "new" grid point values at points NO, SO, and PO in the control volume, respectively. The total moisture diffusivity is evaluated at the control volume faces no and so as indicated in equation (66).

Non-uniform diffusivity determination for the interfaces (e.g. diffusivity dependence on temperature and total moisture concentration; composite diffusivity physical systems) is performed via a harmonic mean of the neighboring grid point values of the diffusivity, as typically expressed in the following equation:

$$D_{h2o} T - G_{st} = ((1 - \alpha')/D_{h2o} T - G_{PO} + \alpha'/D_{h2o} T - G_{SO}) \quad (67a)$$

wherein $\alpha'$ is an interpolation or weighting factor:

$\Delta r / \Delta r_{so}$.

For the case where $\alpha' = 0.5$, the $D_{h2oT} - G_{so}$ is a true harmonic mean of $D_{h2oT} - G_{PO}$ and $D_{h2oT} - G_{SO}$ as expressed in equation (67b):

$$D_{h2oT} - G_{so} = (2 \cdot D_{h2oT} - G_{PO} \cdot D_{h2oT} - G_{SO})/(D_{h2oT} - G_{PO} + D_{h2oT} - G_{SO}) \quad (67b)$$

Equation (67b) applies to control volumes herein the interface so is placed midway between grid points PO and SO.

The control volume grid spacings $\Delta r_{st}$ and $\Delta r_{no}$ in the Figure (9) control volume can be non-uniform in spacing, if so appropriate. The selected grid spacing is generally dependent on the dependent variable rate of change vs. control volume distance; fine or closely-spaced grids are appropriate in systems wherein the dependent variable rate of change with distance is steep.

Proceeding now with the equating of the discretized terms (64) and (66) and simplification/ combining of like terms, the following discretized, linear, algebraic equation representing the conservation of mass integrated over the control volume results:

$$f_P^1 \cdot ph2oT_{PO}^1 = f_N^1 \cdot ph2oT_{NO}^1 + f_S^1 \cdot ph2oT_{SO}^1 + f_P^0 \cdot ph2oT_{PO}^0 + g \quad (68)$$

wherein:

$$f_P^1 = f_N^1 + f_S^1 + f_P^0 \quad (69a)$$

$$f_N^1 = (r_{no}^2 \cdot D_{h2oT} - G_{NO}^0)/\Delta r_{no} \quad (69b)$$

$$f_S^1 = (r_{so}^2 \cdot D_{h2oT} - G_{SO})/\Delta r_{so} \quad (69c)$$

$$f_P^0 = (r^2 \cdot \Delta r)/\Delta t \quad (69d)$$

$$g = 0 \quad (69e)$$

The source term g in equation (68) is of particular importance at the food granule surface, whereby a convective mass transfer boundary condition applies. The source term in this case is as follows:

$$g = h\ conv\ mass \cdot \hat{a} \cdot (ph2o(v)_S - ph2o(v)_B) \cdot r^2 \cdot \Delta r \quad (70)$$

The source term g can be readily linearized to enable application to cases wherein g is a non-linear function of the dependent variable.

The equation (68) discretization equation is a linear algebraic equation and the set of linear equations representing the conservation of mass balances at all control volume grid points can be readily solved employing either iterative or direct solution methods. Uni-dimensional cases can be readily solved via the tri-diagonal matrix algorithm, which is an application of the standard Gaussian-elimination solution technique. Multi-dimensional problems generally require iterative methods to solve the sets of linearized, algebraic equations. This process involves starting with an estimate of the dependent variable values at all grid points to calculate preliminary discretization equation(s) coefficients. The set of linear discretization equations are then solved to update the estimated dependent variable grid point values. This process is repeated until convergence criteria are met.

The discretization of the microscopic level conservation of mass balance is typical of the required procedure to solve the conservation of enthalpy balance. An analogous procedure is employed to discretize or integrate the equation (6) conservation of enthalpy over the spherical food granule control volume and a time interval t to t+t. A set of linearized, algebraic equations are derived, that are readily solvable via direct or iterative solution technique. The macroscopic packed bed level conservation of mass and enthalpy balances are partial differential equations that can be readily solved via control volume discretization application, as described for the microscopic food granule level conservation equations. The governing conservation equations (48) and (52) described earlier are integrated over a packed bed control volume. The conservation equations employ steady-state obeyance as described earlier and are thus not integrated over a time interval, as performed at the microscopic level. The uni-dimensional mass and enthalpy transport assumption is also employed:

The control volume surface area is:

$$dS \leq dY \cdot dZ = 1 \quad (71a)$$

and the volume is:

$$dV = dX \cdot dY \cdot dZ \quad (71b)$$

As an illustrative example of the required discretization procedure, the packed bed conservation of mass balance, equation (48), when discretized over the packed bed control volume results in the following equation:

$$H_{NO} - H_{SO} = (h\ conv\ mass \cdot \hat{a} \cdot (ph2o^*(v)_S - ph2o(v)_B) G_a) \cdot \Delta X \quad (72)$$

The parameters in equation (72) right-hand side are evaluated at the average dependent variable levels for the control volume enveloped between the north and south grid points surrounding point PO. This is one possible method of linearizing the source term in the discretization equation. The set of discretized packed bed conservation balances can be readily solved by either direct or iterative technique, as previously described.

The macroscopic overall system level conservation of mass and enthalpy balances (equations (55) and (59)) are expressed in an integrated form, i.e. integrated over the dehydration compartment control volume in a steady state manner. Thus, the control volume discretization procedure is not applied to the macroscopic overall system level. The governing conservation equations are therefore interpreted as being integrated, but not discretized over the dehydration compartment volume.

The overall mathematical model of the high temperature dehydration processing of food granules comprises three model levels: microscopic food granule; macroscopic packed bed of food granules; macroscopic overall dehydration system. The governing conservation of mass and enthalpy equations are simultaneous and coupled in nature at each individual model level. In addition, there is strong coupling/ information transfer between the different model levels. A sequential, iterative procedure is employed to satisfy the coupling requirement at each model level and between the different levels.

To initiate the overall model solution, either known or best guesses of essential model inputs including infeed food granule attributes (e.g. infeed moisture concentration, temperature), dehydration system operating conditions (e.g. packed bed compartment recirculating air temperature and velocity, food granules throughput, dehydration residence time), and equipment design parameters (e.g. packed bed compartment length and width, number of compartments) are specified. Also, best guesses of parameters in the prediction methods for required physical and transport properties, and both kinetics and thermodynamic relationships are specified.

The microscopic conservation of mass and enthalpy equations are then solved employing the sequential control volume discretization solution method. The essential transport phenomena, thermodynamics, reaction kinetics, and physical/transport properties are evaluated before solving the sets of microscopic conservation equations, in order to determine the discretization equations coefficients. The discretized microscopic level equations are uni-dimensional, thus a direct Gaussian elimination/tridiagonal matrix algorithm can be employed to solve the sets of discretization equations. The microscopic level mass and enthalpy balance equations are solved sequentially and progressively at each and every grid point of the control volume, thus maintaining an iterative and coupled solution nature.

The microscopic level conservation equations are readily evaluated and solved separately at discretized positions along the path of the dehydration system. After solving the microscopic sets of equations at a particular path position, the macroscopic packed bed conservation of mass and enthalpy equations are sequentially solved at the same path position, employing control volume discretization. The microscopic level equations solution information (i.e. food granule(s) temperature, moisture content, browning color conversion at internal and surface positions, per path position or process time) is communicated to the macroscopic level conservation equations to enable solution at that level. The humidity and enthalpy/temperature of the air circulating through the packed bed as a function of bed depth position is the output solution information at the macroscopic packed bed level. This procedure is progressively performed at each discretized position along the path of the dehydration system.

Upon completing this sequence for an entire compartment of the dehydration system, the macroscopic overall system conservation of mass and enthalpy integrated equations are solved via algebraic procedures for the overall compartment inlet recirculating air temperature and humidity. The output solution information from the macroscopic packed bed level within this compartment is communicated to the macroscopic overall system level to enable solution. The procedures described for the microscopic and macroscopic levels are repetitively performed for all path positions and compartments within the dehydration system, in progressive order from dehydration system infeed to discharge.

Upon completing the aforementioned procedure for the entire dehydration system, adaptive model tuning or optimization can be performed to update original guesses or values for parameters in the prediction methods for physical and transport properties, thermodynamics, reaction kinetics, and transportphenomena. The adaptive tuning techniques will be described below. Adaptive tuning is employed until convergence criteria and/or objective function(s) are satisfied (e.g. minimize least squares difference of calculated granule moisture vs. measured granule moisture).

After completing this procedure, the complete sequence described above is repeated employing updated model parameters and results from the previous solution of the conservation equations for each model level. This complete procedure is again performed sequentially from dehydration infeed path position to discharge location; the procedure is repetitively performed until convergence criteria are met. Convergence time will increase when input variable(s) upsets are introduced; the microscopic level model is dynamic in nature and will react to input disturbances effectively.

The overall model solution procedure can also be adapted to explore optimization of the food granule attributes (e.g. discharge temperature, color, moisture concentration) and/or process efficiency (e.g. fuel consumption rate per packed bed throughput). Adaptive tuning methods can be employed to investigate physical system operating conditions and/or infeed food granule attributes to attain process and/or food product optimization.

The application of adaptive, self-tuning procedures to provide for overall mathematical model optimization will now be described. These include both single and multiple parameter adaptive tuning methods and suggested methods of simulation flowtrain application.

As discussed earlier, adaptive model tuning is employed to update original guesses or latest values for parameters in the prediction methods for physical and transport properties, thermodynamics, reaction kinetics, and transport phenomena. It is pertinent to note that relaxation or damping of model solution information is often necessary to attain stability requirements (refer to equation (61)). The adaptive model tuning procedure is generally employed during the mathematical model simulation, until objective function(s) and/or convergence criteria are satisfied. A typical convergence criterion is minimized least squares difference between the model calculated dependent variable(s) for successive iterations and a typical objective function is the least squares difference between the model calculated and observed attribute(s).

A typical single variable adaptive tuning method is the regula falsi method which employs iterative procedure for solving non-linear equations when the function f(x) represents a monotonic smooth curve and the solution is unique over the range defined by the lower and upper bounds. This method involves evaluating the function corresponding to two guessed values of the solution, within the set bounds, and using a straight line connecting the two points to approximate the function. This procedure generates a new guess value which is used in a new approximation of the function and so on. If any iteration generates a guess value outside the set bounds, then the difference between the latest two guessed values is reduced by a factor of two until the new guess value is within set bounds. The process terminates when f(x)·0 and/or the convergence criturion/objection function(s) are satisfied.

An applicable multi-variable tuning method is the Simplex method. The objective function(s) is evaluated at n+1 mutually equidistant points (i.e. vertices of the simplex) in the space created by the n independent variables. For a three dimensional case, the n+1 points form a regular tetrahedron. It is pertinent to note that careful pre-selection of the search bounds is essential when employing this technique to avoid convergence satisfaction at model parameters that are not feasible. Generally, adaptive model tuning is best performed after completion of the overall model solution for each individual dehydration system compartment and/or the entire dehydration unit.

The mathematical model of the simultaneous and coupled heat and mass transport based food unit operation can be employed to investigate the effects of pertinent operating and design parameters and raw material attributes on the food product dynamic attribute profiles. Testing of the mathematical model performance and verification of model predicted attribute profiles were performed to date for a variety of high temperature dehydration processes and different food granular materials. Performance accuracy of the mathematical model applied to the variety of different test systems was generally rated at +6% or less standard error of the experimental food granule dynamic attribute profiles. The standard error includes the experimental measurement error, in addition to modelling simplification error. The above rated standard error is generally well within process tolerances. It should also be noted that the standard error reflects "absolute" attribute experimental vs. model predicted least squares difference comparison; the mathematical model provides useful "relative" process trend information (e.g. process gain), that is usually independent of the "absolute" referenced standard error.

A typical test case will now be depicted to demonstrate the prediction performance of the mathematical model as applied to a practical high temperature dehydration process. Results of actual pilot scale test experimentation will be compared to mathematical model predictions to both verify performance accuracy and to interpret process/product behavior.

The test case selected is the convection roasting of a packed bed of peanuts. The pilot scale experimental packed bed is notably batch in design, with through circulation airflow normal to the packed bed, and independent controls of inlet air temperature and humidity, bed air velocity, airflow direction, and bed loading/depth. It is pertinent to note that such a test system actually depicts very well a continuous moving bed, as defined earlier. In such a case, the batch process or residence time scales or equates directly to the continuous system compartment(s) length/linear speed. Noting the aforementioned pilot scale operating controls, the pilot batch system operation can thus replicate continuous system performance.

The ranges of experimental input operating conditions and infeed raw material attributes employed in the course of the pilot scale experimentation will now be presented. The mathematical model simulations were subjected to the same range of experimental input conditions to verify accuracy and evaluate process performance and behavior. The ranges of input conditions employed are summarized as follows:

| Operating Parameters: | |
|---|---|
| Inlet air temperature range: | 410–490 deg K |
| Bed air velocity range: | 1.3-1.8 m/sec |
| Initial bed loading range: | 33.4-66.8 kg (wet basis)/ m$^2$ |
| Residence time range: | 150-1400 sec |
| Air flow direction: | 25% cycle up/ 25% cycle down 25% cycle up/ 25% cycle down (repeated sequence per test). |
| Ambient temperature: | 295-300 deg K |
| Ambient humidity: dry air | .009-.011 kg h2o/kg |
| Cooling air temperature/humidity: | Ambient conditions |
| Cooling residence time | 300 sec |
| Infeed Attributes | |
| Moisture content: | 6 kg h2o/100 kg wet nut |
| Temperature: | 300 deg K |
| Effective nut diameter | 9.45 mm |
| Browning reaction fractional conversion | 0.0-1.0 |

Testing procedure involved varying either inlet air temperature, bed air velocity, or bed loading/depth, while by maintaining the remaining operating parameters and infeed attributes at standard constant levels, within the ranges or at the levels indicated above. Multiple residence times were employed for each of the major operating parameter studies. Each test employed cooling at the conclusion of the planned roasting residence time to "quench" on-going chemical reactions (e.g. texturization, Maillard browning). Constant cooling operating parameters were employed during the experimental testing. The peanut bed was measured for the following attributes at the conclusion of each test: Browning color reaction fractional conversion: nut surface and mass average at different bed positions; average nut moisture content at different bed positions. Nut surface temperature was continuously monitored per test at different bed positions.

The mathematical model as applied to the experimental nut packed bed convection roasting system can be readily employed to simulate the effects of the major operating parameters, equipment design parameters, and infeed raw material properties on the food granule attribute(s) dynamic profiles. Use of the mathematical model to determine the "cause-effect" relationships is extremely advantageous noting the large number and variety of simulation studies that can be performed, with minimal time and cost investment. It is pertinent to note that the accuracy of the simulation results are directly dependent on adaptive model tuning of key physical/chemical/transport properties for the system operating range of interest.

To illustrate the application of the mathematical model simulation to describe the effects of operating parameters and infeed material properties on the food granule attribute dynamic profiles, representative input variables are selected. The effects of inlet air temperature and bed air velocity on the following nut attribute dynamic profiles are exhibited: average moisture content, center bed position; mass average browning fractional conversion, center bed position; surface temperature, center bed position. Experimental nut roasting data is also included in each of the simulation cases to illustrate comparison between experimental data and simulation results. The aforementioned simulation cases are presented in FIGS. 4 through 9.

It must be reemphasized that the mathematical model can be readily employed to study, verify, and/or explain many different process/product characteristics or behavior. The simulations presented in FIGS. 4 through 9 are example applications to illustrate the use of this approach to characterize process and product behavior and "cause-effect" relationships. For e.g., the effect of infeed raw material moisture content on the average nut moisture content, center bed position dynamic profile is typical of the multitude of additional cases that can be studied via the mathematical modelling approach. This additional representative simulation case is presented in FIG. 10 experimental data was not available for comparison purpose in this case.

For the mathematical model simulations and actual experimental data depicted in FIGS. 4 through 9, many observations can be made regarding the process/product behavior and physical/chemical significance. Major observations will now be discussed.

Figure 4:
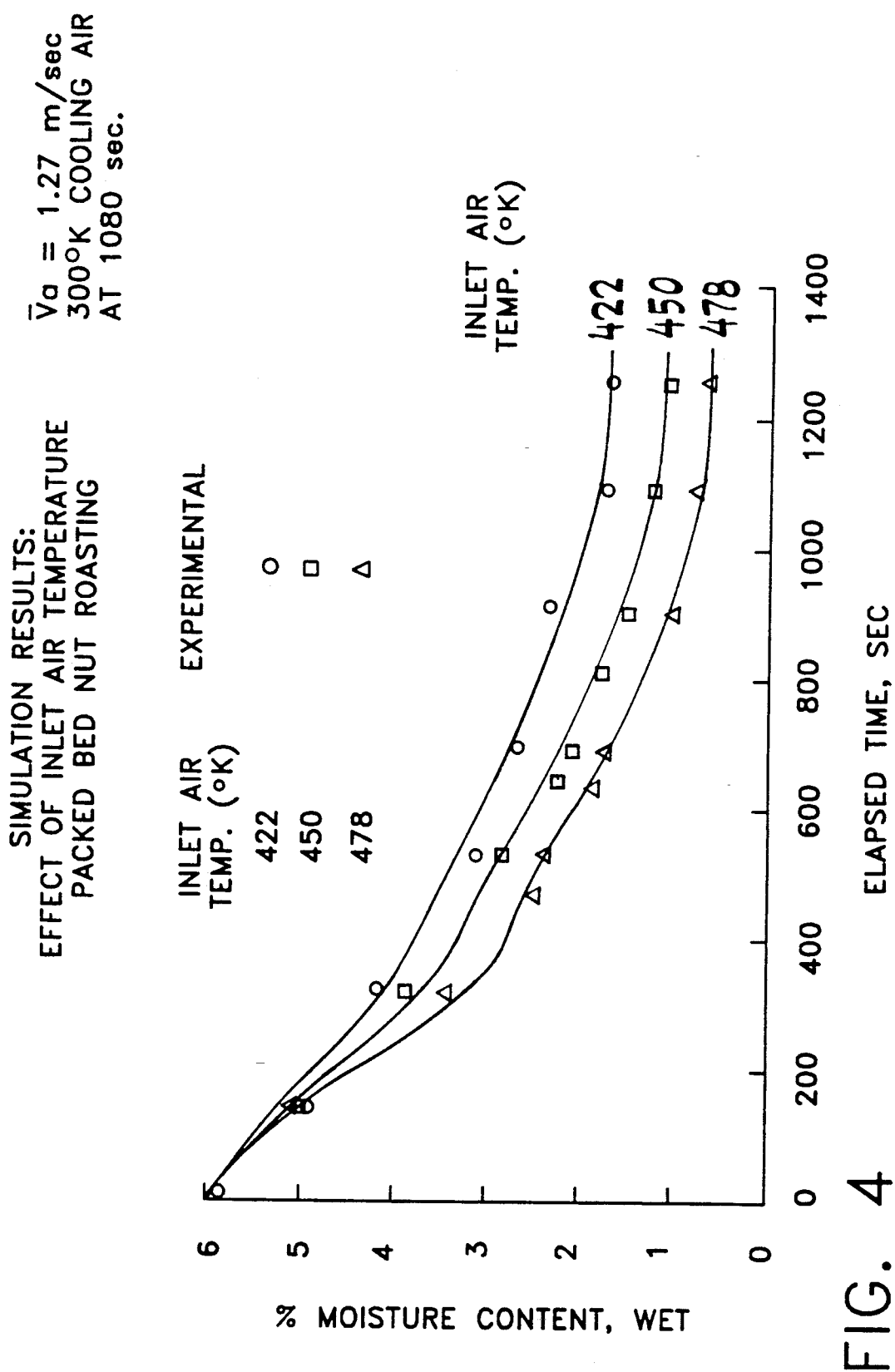
FIGS. 4–10 show simulation cases to illustrate a comparison between experimental data and simulation results.

The effect of inlet air temperature on the nut dynamic average moisture content profile, center bed position is presented in FIG. 4. Simulation results and experimental data are in close agreement at all inlet air temperatures employed. The FIG. 4 simulation indicates that inlet air temperature has a significant enhancement effect on the resulting dynamic average moisture content profile. The nut average drying rate is relatively constant and highest during the initial 10 to 20% of the total residence time per test and decreases substantially during the remainder of the roast cycle. In the latter "falling rate" period, which is 80 to 90% of the roast cycle, the nut average drying rate is limited and controlled by the internal transport (i.e. diffusion) of moisture. Surface mass transfer resistance is relatively low, in comparison to the higher diffusion resistance The dimensionless Sherwood number, N(SH), as defined in equation (73), is determined to be typically $3.35 \times 10.3$ indicating very low surface resistance, in comparison to the internal mass transfer resistance.

$$N_{SH} = h\ conv\ mass/Dh2o\ T - G \cdot \hat{a} \tag{73}$$

The nut surface moisture content is typically lower than the average and internal positions moisture contents during this "falling rate" period, based on the high internal mass transfer resistance vs. lower surface resistance. Thus, the effect of inlet air temperature on nut surface drying rate is high, particularly in the initial roast cycle phase, wherein the mass transfer driving force (i.e. $\rho h2o^* T_S - \rho h2o\ T_B$) is highest.

Notably, the mathematical model simulation outputs dynamic attribute profiles at different discrete nut positions (i.e. internal and surface positions) and at different packed bed depth positions; the nut moisture content and browning color reaction conversion simulations illustrate mass average nut center packed bed predictions and observed data only.

Increasing inlet air temperature does result in significant enhancement of the overall roast cycle nut average drying rate, as presented in FIG. 4; the moisture diffusivity is dependent on both temperature and moisture content according to the modified Arrhenius relationship (Equation (36)).

Figure 7:
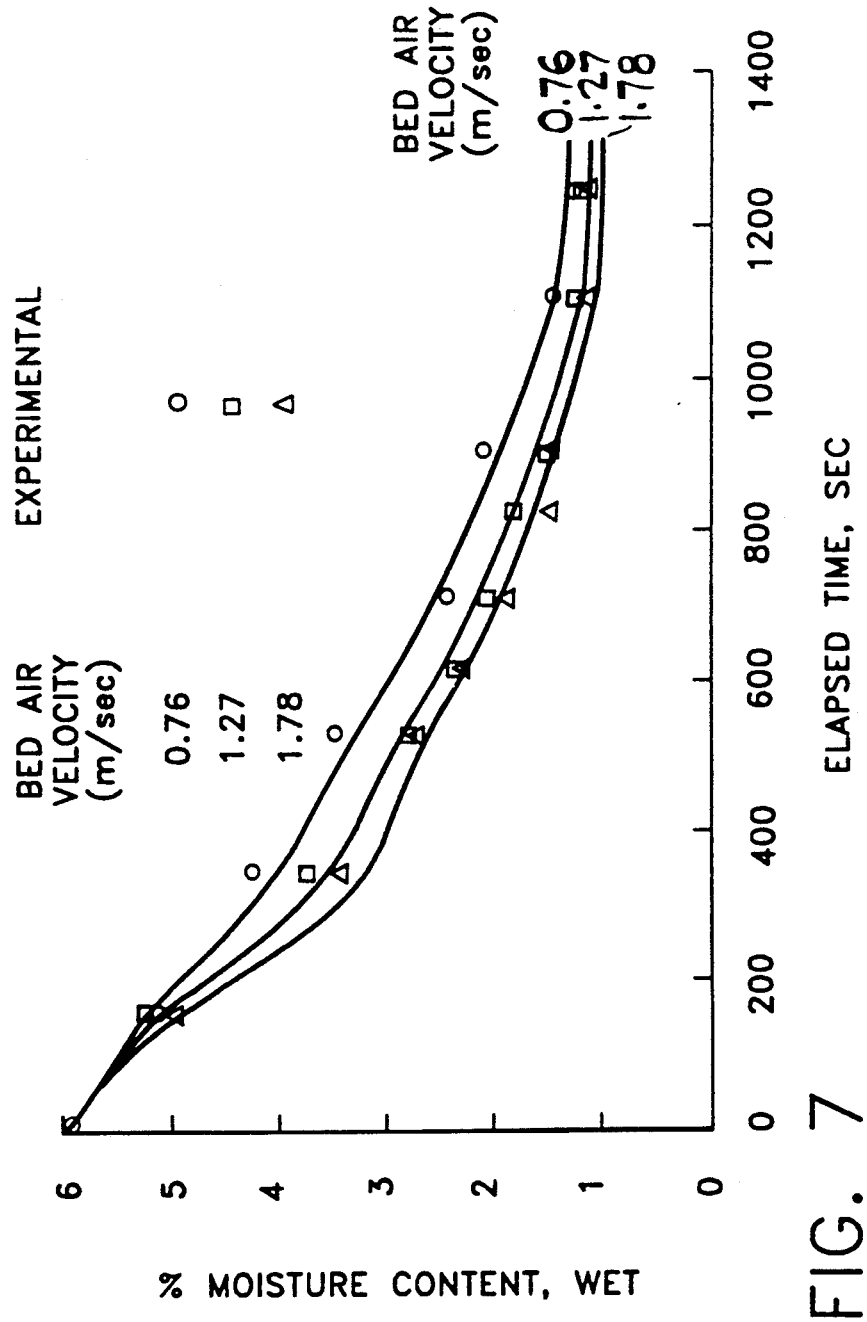

The effect of bed air velocity on the nut dynamic average moisture content profile, center bed position is illustrated in FIG. 7. Simulation results and experimental data are in relatively close agreement at all bed air velocities employed The relationship of bed air velocity to the nut average drying rate is similar in interpretation to the FIG. 13 inlet air temperature parameter case. During the majority (e.g. latter 80 to 90%) of the roast cycle, increasing bed air velocity enhances moderately the nut drying rate. The internally limited mass transfer, as indicated by the N value, minimizes the potential enhancement effect of air velocity on the drying rate. The relatively short initial constant rate phase of the roast cycle would benefit most from the effects of increasing air velocity on the drying rate. It should be noted that the mathematical model predicts much higher nut surface drying rates during the initial phases of the roast cycle (e.g. initial 25 to 50% of the roast cycle) for all air velocity conditions. In this case, air velocity level is most critical in terms of its effect on the nut surface drying rate.

Figure 5:
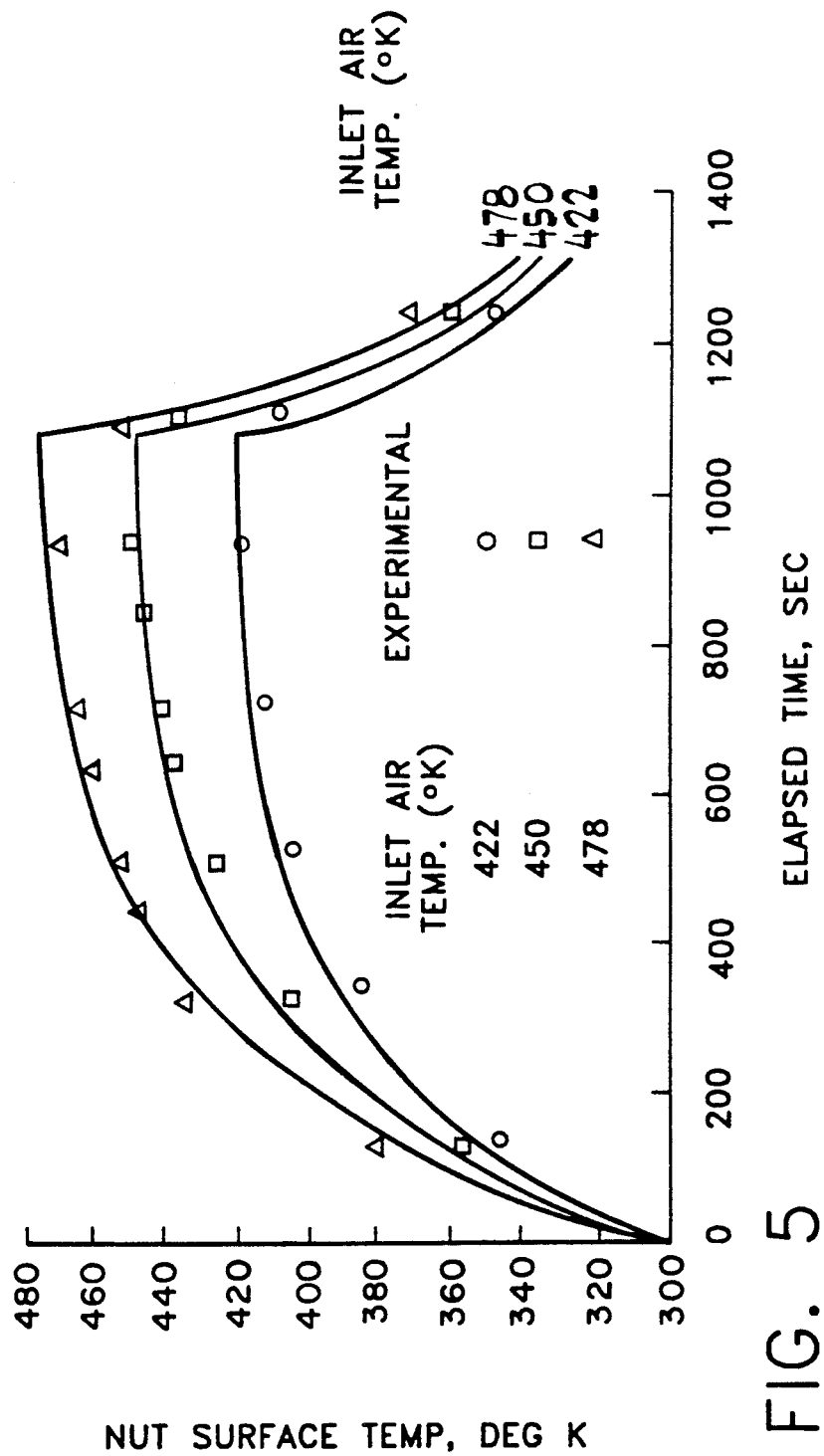

The effect of inlet air temperature on the nut surface temperature, center bed position dynamic profile is illustrated in FIG. 5. Simulation results and experimental data are in relatively close agreement at all inlet air temperatures employed. The FIG. 5 simulation indicates that inlet air temperature has a substantial enhancement effect on the resulting dynamic surface temperature profile. The surface convective heat transfer in comparison to the internal heat conduction denotes that both surface convection and internal heat transfer (e.g. conduction) are of importance in controlling the resulting heat transfer rate (in addition to moisture vaporization). The dimensionless Nusselt number, $N_{Nu}$, defined in equation (74), is determined to be typically 0.54, indicating that both heat conduction and convective surface heat transfer resistance are important controlling resistances.

$$N_{NU} = h\ conv\ heat/KG \cdot \hat{a}) \tag{74}$$

An increase in air temperature thus enhances the surface convection heat transfer driving force (i.e. $T_{GS} - T_{aB}$), which in turn enhances the internal heat conduction drive force, vaporization rate, and governing nut thermal conductivity Note that enhancement of the vaporization rate results in a nut "cooling" effect. At the nut surface, as noted earlier, the relatively lower moisture content at the surface vs. other internal positions, for most of the roast cycle, promotes more rapid surface relative heating rate (i.e., decreased vaporization "cooling" effect).

The resulting surface dynamic temperature-time profile for all inlet air temperature cases illustrated in FIG. 5, typically indicates initial rapid nut heating rate increase followed by decreasing heating rate during the latter portion of the roast cycle. During the early phase of the roast cycle, sensible heat contribution is high and the convective heat transfer driving force is high, promoting rapid heating rate; during the latter phase, latent heat contribution is higher and the driving forces for both convective and conductive heat transfer are typically lower, resulting in lower heating rate. It should be noted that the nut surface temperature-time gradient is steeper than the internal mass average temperature-time gradient during the initial roast cycle phase (e.g. initial 25 to 50% of the cycle) based on enhanced convective driving force with lower relative conduction resistance at the surface position.

Figure 8:
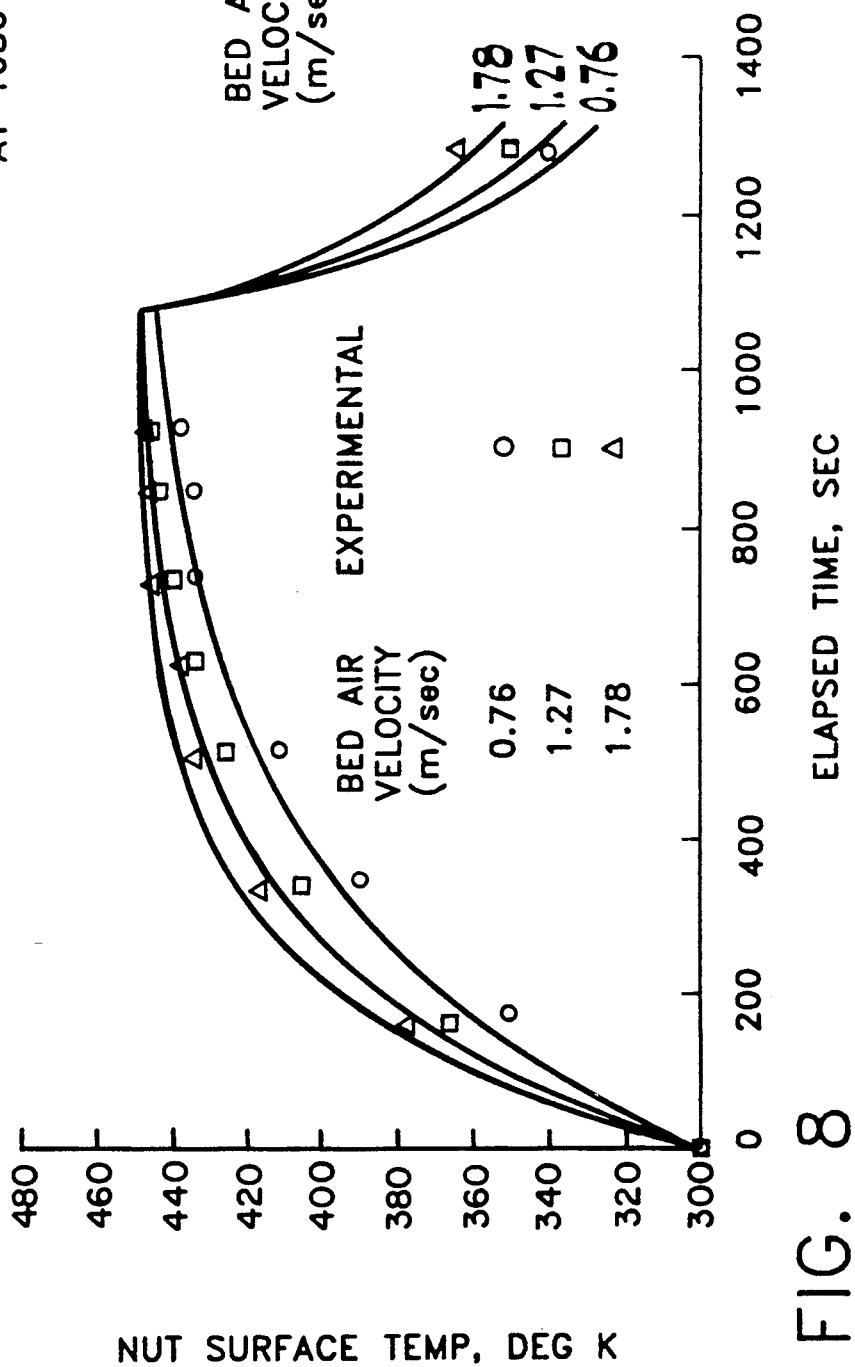

The effect of bed air velocity on the nut surface temperature, center bed position dynamic profile is exhibited in FIG. 8. Agreement between simulation results and experimental data is satisfactory. Bed air velocity has a significant effect on the nut surface temperature-time profile; increasing air velocity typically minimizes the nut surface heat transfer resistance, thus also promoting enhanced nut heat conduction and moisture vaporization. The effects of increasing bed air velocity are best realized during the initial roast cycle phase, wherein the convective driving force is greatest. It should be noted that there is an optimum bed air velocity level, at which further bed air velocity increases result in steadily lower heat transfer rate enhancements.

Figure 6:
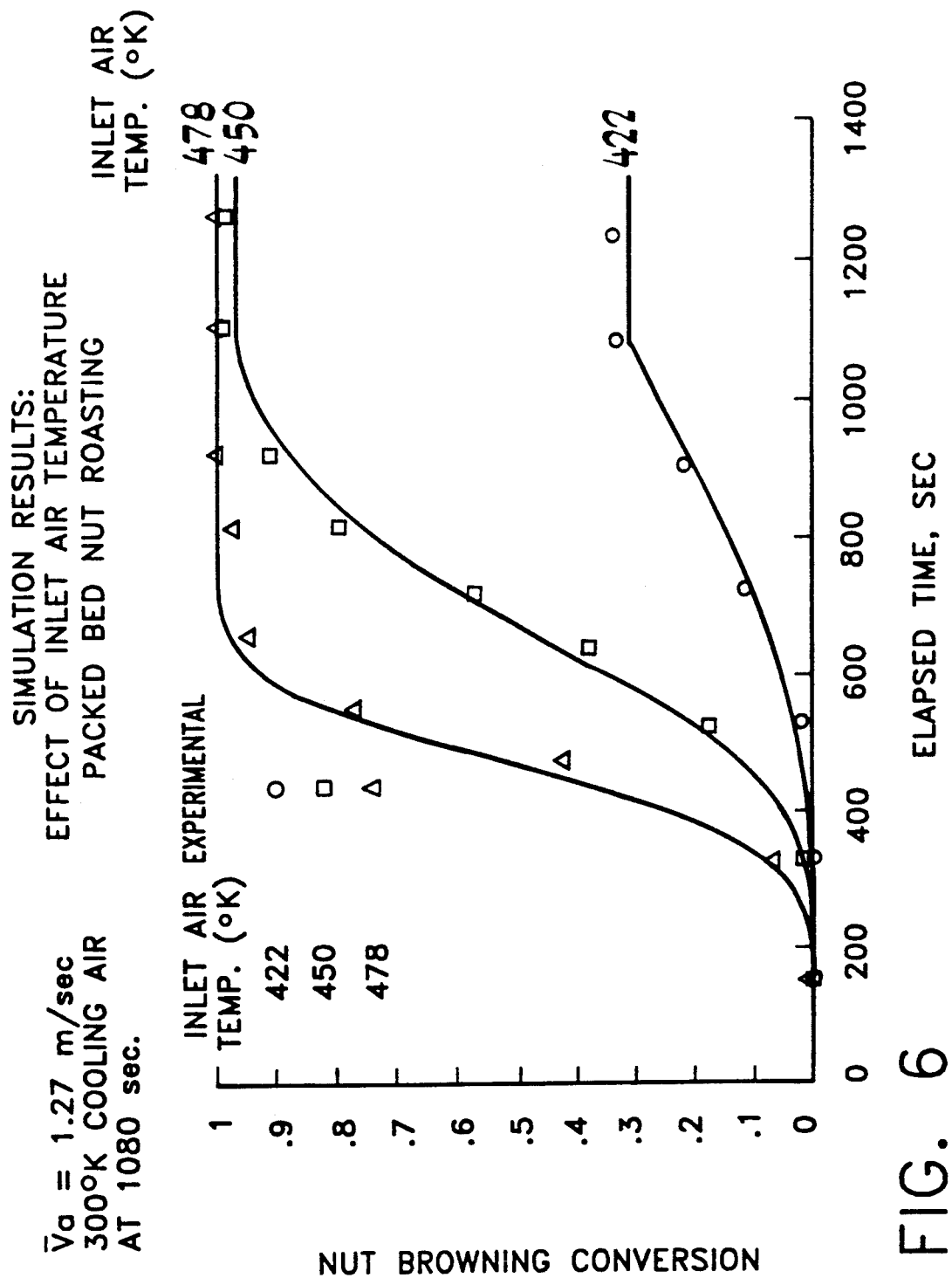
Figure 9:
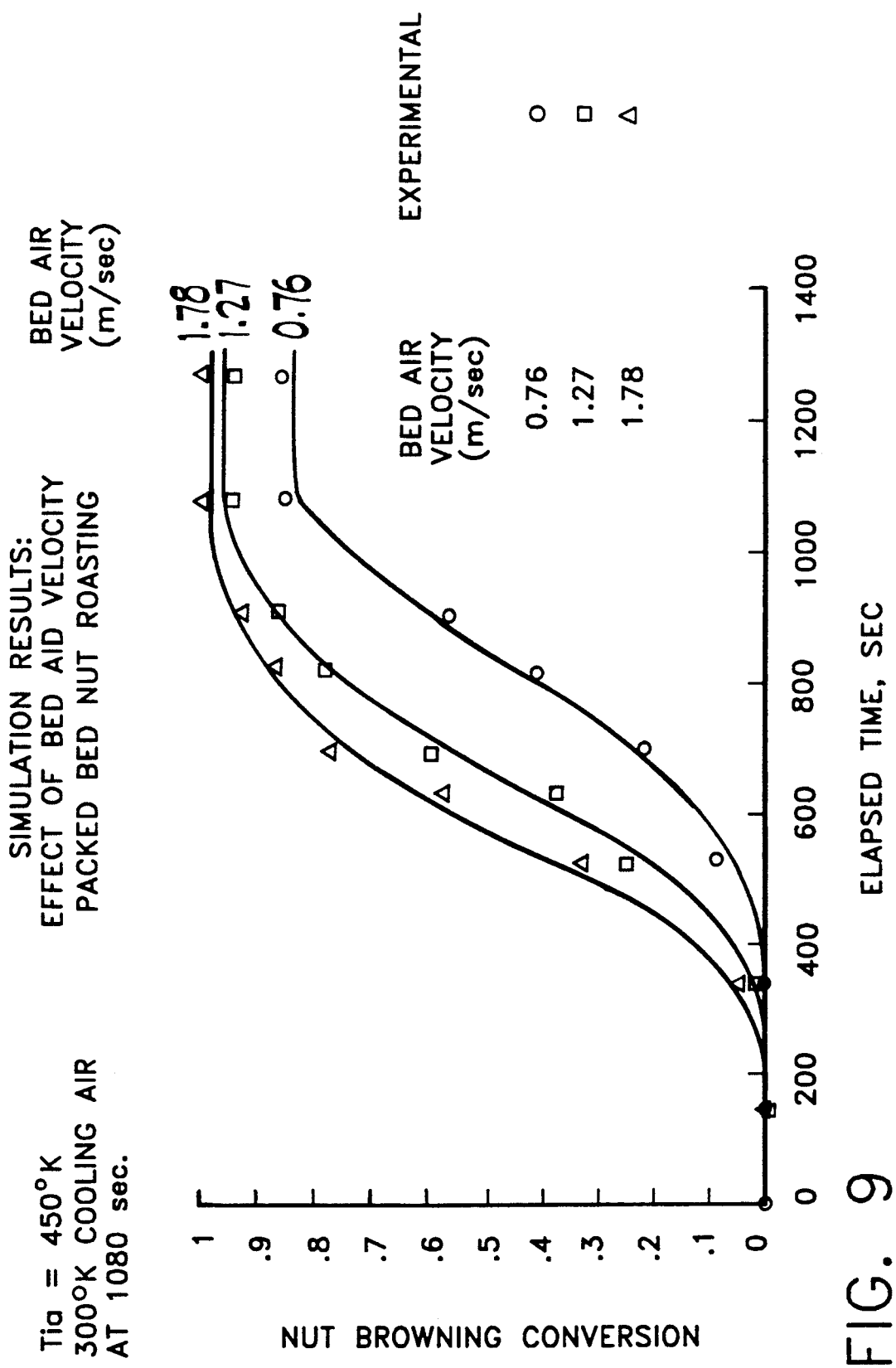

The effects of inlet air temperature and the bed air velocity on the mass average browning color fractional conversion, center bed position dynamic profile are exhibited in FIGS. 6 and 9, respectively. As explained earlier, non-enzymatic browning is modelled as a first order kinetics mechanism, with the fractional conversion dependent on an absolute/collision theory rate constant and a generalized temperature-time integrated history governed by an Arrhenius factor, Thermal Time ($\tau$), as defined in equation (12). This kinetic modelling approach accurately depicts the browning color development during the nut roast cycle. Experimental data at all operating levels are in close agreement with the simulation predicted values. Employment of this first order exponential reaction kinetics model characterizes well the low conversion rate during the early roast cycle phase, followed by rapid conversion rate during the latter phase of the roast cycle. This behavior is well explained by the exponential conversion dependence on the generalized reaction time history or Thermal Time ($\tau$). Both inlet air temperature and bed air velocity have pronounced effects on the mass average browning fractional conversion dynamic profile. In accordance with the previously noted effects of inlet air temperature and bed air velocity on the nut temperature dynamic profile, the browning fractional conversion dynamic profile is also enhanced by increases in nut temperature, following the aforementioned first order exponential Thermal Time ($\tau$) dependence.

Cooling air application is essential to "quench" the exothermic Maillard browning reaction (11); apparent reaction threshold temperature is 394 deg K. Thus, cooling air application to cool the nut product to below this threshold level is sufficient to prevent additional browning conversion.

Figure 10:
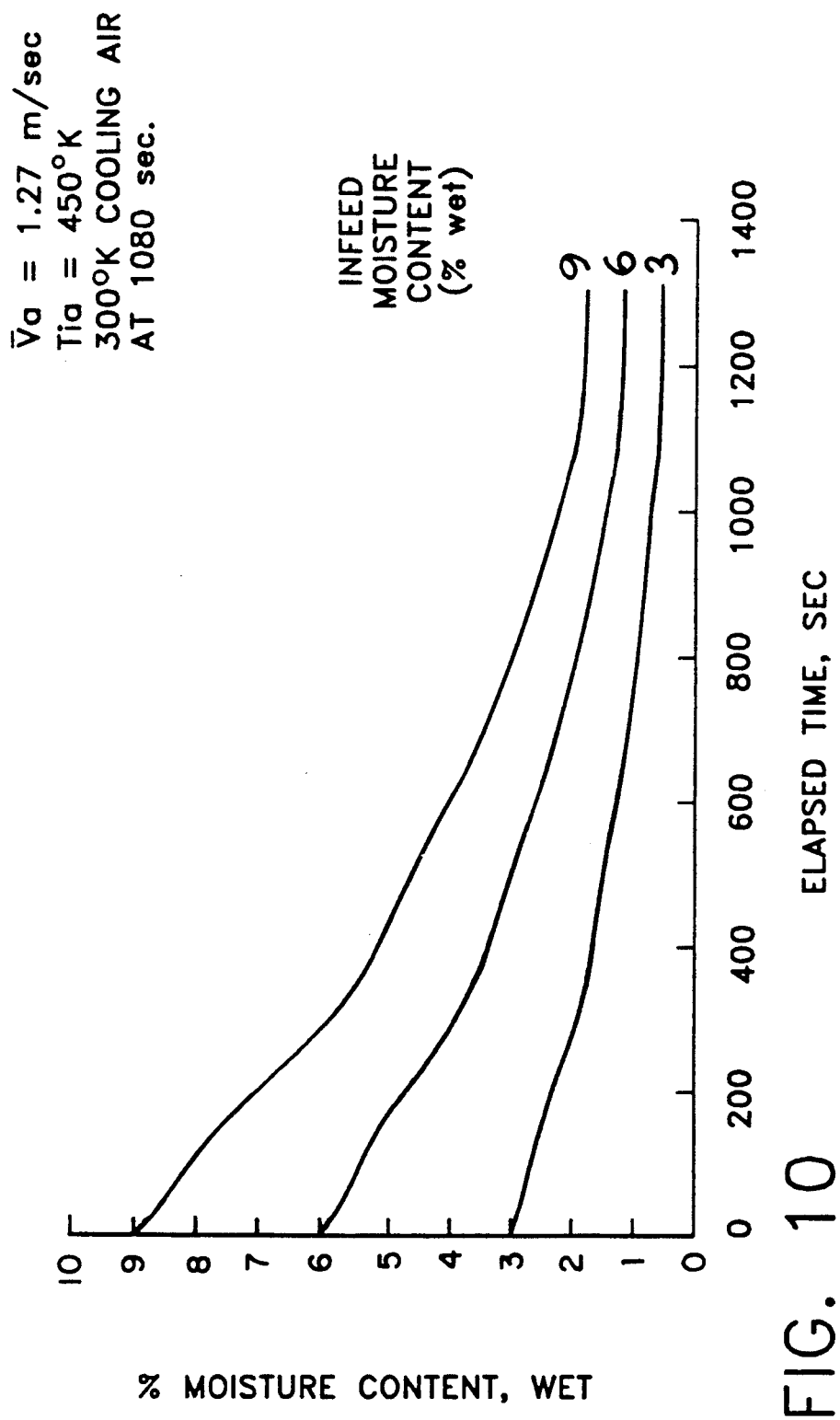

The effect of infeed raw material moisture content on the average nut moisture content, center bed position, is illustrated in FIG. 10. As mentioned earlier, experimental data is not available for comparison purpose; this simulation case is representative of the multitude of additional cases that can be studied via the mathematical modelling approach. The slopes of the simulation predicted moisture content vs. process time profiles are similar for the different cases of varying infeed moisture content; drying rate differences are present during the earlier stages of the roast cycle (e.g. initial 10–15% of roast cycle). These drying differences are due to enhanced convective mass transfer driving force ($\rho h2o_S{}^*T - \rho h2o\ T_B$) during the initial phase of the roast cycle.

The experimental data for each studied high temperature dehydration system is employed for adaptive model tuning, as described earlier. Employing the experimental pilot scale packed bed nut roasting data described in this section, adaptive model tuning was performed to determine the mathematical model parameters that govern key physical/chemical/transport properties.

Based on satisfying the objective functions (e.g. minimize least squares difference of predicted vs. observed product attributes) for adaptive model tuning, employing the aforementioned pilot scale experimental test data resulted in the following key model parameters:

| | |
|---|---|
| Food granule total moisture diffusivity parameters: | $A = 4.904 \times 10^{-5}$ |
| | $B = 4.7$ |
| | $C = 55.7$ |
| | $D = -4500.0$ |
| Convective heat transfer coefficient parameter: | $1 = 1.73$ |
| Browning color reaction kinetics parameters: | |
| $E_{ACT} = 1.294 \times 10^8$ KJ/mole | |
| $k_0 = 2.083 \times 10^{-14} \sec^{-1} \cdot \deg K^{-1}$ | |

The aforementioned mathematical model parameters for key physical/chemical/transport properties are valid for the operating parameters ranges presented in this section. Employment of the mathematical model and parameters for operating variables outside of the established ranges, may require additional model tuning, depending on individual accuracy requirements.

What is claimed:

1. Apparatus for automatically controlling a food treatment device in a process for preparation of a food product, comprising:
   a sensor device to sense and measure food product characteristics, including food product color;
   said sensor device adapted to be coupled to the food treatment device to sense and measure the food product characteristics, including food product color, during the operation of the food treatment device;
   said sensor device including an output to output sensor information based on the sensed and measured food product characteristics, including food product color;
   a first level supervisor coupled to the output of the sensor device to receive as an input the sensor information, including sensor information relating to the sensed and measured color of the food product, said first level supervisor including means for simulating the food treatment device based on a predictive simulation control model using the measured color of the food product, to generate feedback and feedforward transfer information as a function of the sensor information;
   a second level supervisor coupled to the first level supervisor, the second level supervisor having initial predetermined setpoints therein and providing a setpoint recipe table to the first level supervisor, the second level supervisor also adapted to interface with an operator; and
   a processor coupled to the means for simulating, the processor adapted to receive the feedback and feedforward transfer information, the processor providing adjusting signals to the food treatment device as a function of the feedback and feedforward transfer information to thereby adjust the process for preparation of a food product.

2. The apparatus of claim 1 wherein the second level supervisor is a computer.

3. The apparatus of claim 1 wherein the means for simulating comprises a predictive simulation control model residing in a real time microprocessor, the predictive simulation control model adapted to accept as input the sensor information from the food treatment device.

4. The apparatus of claim 1 wherein the initial predetermined setpoints are continuously updated by the feedback and feedforward transfer information.

5. A food treatment system having automatic control of a process for preparation of a food product, comprising:
   a food treatment device;
   a sensor device to sense and measure food product characteristics, including food product color;
   said sensor device coupled to the food treatment device to sense and measure the food product characteristics, including food product color, during the operation of the food treatment device;
   said sensor device including an output to output sensor information based on the sensed and measured food product characteristics, including food product color;
   a first level supervisor coupled to the output of the sensor device to receive as an input the sensor information, said first level supervisor including means for simulating the food treatment device based on a predictive simulation control model using the measured color of the food product to generate feedback and feedforward transfer information as a function of the sensor information;
   a second level supervisor coupled to the first level supervisor, the second level supervisor having initial predetermined setpoints therein, and providing a setpoint recipe table to the first level supervisor, the second level supervisor also adapted to interface with an operator; and a processor coupled to the means for simulating, the processor adapted to receive the feedback and feedforward transfer information, the processor providing adjusting signals to the food treatment device as a function of the feedback and feedforward transfer information to thereby adjust the process for preparation of a food product.

6. The apparatus of claim 5 wherein the food treatment device comprises a multi-zone oven having a first end and a second end, and also having a movable conveyor mounted therein, such that food products placed at the first end are conveyed towards the second end.

7. The apparatus of claim 6 wherein the sensor device includes first and second color sensors mounted near the first and second ends of the multi-zone oven, respectively, the first and second color sensors being adapted to measure color of the food product and output color information corresponding to such measurements to the first level supervisor.

8. The apparatus of claim 7 wherein the means for simulating comprises a predictive simulation control model adapted to accept as input the sensor information from the sensor device including the color information from the color sensors, the predictive simulation control model further adapted to control food product color to achieve a desired food product color by determining color at the first end of the oven and using the sensor information to adjust temperature and air flow within a particular zone of the multi-zone oven, the predictive simulation control model applying predetermined interrelationships between food product color, oven temperature and air flow to achieve the desired food product color.

9. The apparatus of claim 8 wherein the predictive simulation control model monitors conveyor speed.

10. The apparatus of claim 7 wherein the first and second color sensors comprises NIR sensors.

11. A method for automatically controlling a food treatment device in a process for preparation of a food product, comprising the steps of:

sensing and measuring sensor information for a food product being processed in the food treatment device, the sensor information including a measurement of food product color;

receiving in a processor the sensor information including the measurement of food product color;

operating the processor to simulate the food treatment device, based on a predictive simulation control model using the sensed and measured food product color to generate feedback and feedforward transfer information as a function of predetermined interrelationships between process variable and food product color; and using the feedback and feedforward transfer information to control the operation of the food treatment device.

12. The method of claim 11 wherein the step of receiving sensor information further comprises the steps of:

measuring the color of a food product at first and second predetermined points in the process for preparation of a food product using color sensors and producing signals corresponding to such measurements; and receiving in the processor color sensor signals.

13. The method of claim 12 further comprising the step of operating the food treatment device to produce a food product of a desired color, including the steps of:

sensing and measuring the color of the food product at the predetermined first point;

using the predictive simulation control model and the color sensed and measured at the predetermined first point to predict the color of the food product at the predetermined second point; and adjusting the process conditions in the food treatment device in accordance with the predetermined interrelationships to achieve the desired color of the food product.

* * * * *